United States Patent [19]
Sheldon

[11] Patent Number: 5,993,049
[45] Date of Patent: Nov. 30, 1999

[54] METHOD AND SYSTEM FOR CALCULATING MASS AND ENERGY BALANCE FOR GLASS FURNACE REBURN

[75] Inventor: Mark S. Sheldon, Huntington Beach, Calif.

[73] Assignee: Gas Research Institute, Chicago, Ill.

[21] Appl. No.: 08/558,888

[22] Filed: Nov. 16, 1995

[51] Int. Cl.$^6$ ................................................ F27D 15/00
[52] U.S. Cl. .................... 364/578; 364/503; 364/477.04; 373/31
[58] Field of Search ..................................... 364/503, 500, 364/497, 578, 477.03, 477.04; 373/27, 30, 31; 432/179, 180

[56] References Cited

U.S. PATENT DOCUMENTS

| | | | |
|---|---|---|---|
| 4,255,133 | 3/1981 | Tanifuji et al. | 432/24 |
| 4,302,205 | 11/1981 | Muraki et al. | 23/232 R |
| 4,314,345 | 2/1982 | Shiraishi et al. | 364/500 |
| 4,347,072 | 8/1982 | Nagaoka et al. | 65/27 |
| 4,372,770 | 2/1983 | Krumwiede et al. | 65/27 |
| 4,796,194 | 1/1989 | Atherton | 364/468 |
| 4,827,429 | 5/1989 | Silvestri, Jr. | 364/494 |
| 5,202,843 | 4/1993 | Kunimine et al. | 364/578 |
| 5,238,396 | 8/1993 | Yap | 431/10 |
| 5,369,567 | 11/1994 | Furuta et al. | 364/149 |
| 5,504,692 | 4/1996 | Cardner | 364/500 |
| 5,572,445 | 11/1996 | Shook et al. | 364/557 |

OTHER PUBLICATIONS

Venkateswaran et al., "Modeling of the Glass Melting Process," 1990 IEEE, pp. 1343–1347.

Kotake and Hijikuta, "Numerical Simulations of Heat Transfer and Fluid Flow on Personal Computer," Elsevier Science Publishers, 1993, TJ 260.K635. (A Book !).

Pulse Combustion:Impinging Jet Heat Transfer Enhancement *Combust. Sci. and Tech.*, 1993, pp. 147–165.

Measurement of the Optical Properties of Coal–Derived and Propane–Derived Soot in a Flat Flame Reactor; J. Rigby and B. Webb, Mech. Eng. Dept., Brigham Young Univ. and T. Fletcher, Chem. Eng. Dept., Brigham Y. U.

Heat Transfer Optimization in TV Glass Furnaces;pp. 141–151; W. J. Horan, Techneglas, Inc. and A.G. Slavejkov and L.L. Chang, Air Products and Chemicals, Inc.

Flue Gas Heat Recover in Glass Furnances, Reprinted From *Glass*, Nov. 1983, P. Bony.

Thermal Peformance of Cruciform Regenerator Packings, Reprinted from *Glass*, Mar., 1990, A. Zanoli, E.R. Begley, R. Videl and D. Lagarenne.

The Influence of the Thermal Properties of Refractories and Their Mode of Utilisation on the Heat Balance in Regenerators, Glass Technology, vol. 21, No. 4, Aug., 1980, J. Delrieux.

*Primary Examiner*—Vincent N. Trans
*Assistant Examiner*—Russell W. Frejd
*Attorney, Agent, or Firm*—Thomas, Kayden, Horstemeyer & Risley. L.L.P.

[57] ABSTRACT

A method and system for determining a mass and energy balance for a glass furnace proceeds through a furnace model and calculates a number of parameters for the flows within each segment of the furnace. The mass flow rate, enthalpy, and enthalpy flow rate of each mass flow entering a segment is found and then the enthalpy and temperature of the unreacted mixture is determined. Based on an assumption that the flows entering a segment combust completely and instantaneously, the enthalpy, enthalpy flow rate, mass flow, composition, and temperature of a reacted flow exiting the segment is determined. If the furnace implements reburning, then the mass flows for the furnace are adjusted. Also, the mass and energy for each flow can be determined if the furnace has a regenerator, a recuperator, or a reburning system. Further, the mass and energy for each flow can be determined for a wide range of furnace types.

42 Claims, 30 Drawing Sheets

DISTANCE FROM BOTTOM

METHOD AND SYSTEM FOR CALCULATING MASS AND ENERGY BALANCE FOR GLASS FURNACE REBURN

Reference is made to an Appendix which contains a listing of a computer program, data files, and sample input and output files, not available Herein, But available in the file wrapper.

Reference is also made to two copending U.S. Patent applications filed on even date herewith by the same inventor.

BACKGROUND OF THE INVENTION

1. Field of the Invention

The present invention generally relates to a method and system for modeling the behavior of a furnace and, more particularly, to a method and system for modeling a furnace to determine the mass and energy flow rate for each gas stream within the furnace.

2. Description of the Prior Art

In the United States, glass manufacturing furnaces generally fall into three broad classes of furnaces: container glass furnaces, flat glass furnaces, and fiber glass furnaces. The container glass furnaces produce approximately 65 percent of all the glass manufactured in the United States and typically either have an end port design or a side port design. The flat glass furnaces produce about 20 percent of the glass in the United States and mainly employ either a float glass method or an energy and labor intensive flat glass method. The fiber glass and specialty glass furnaces are generally smaller than the other types of furnaces and produce approximately 20 percent of the glass in the United States.

The three types of glass furnaces operate under different conditions. For instance, the temperature profiles within the three types of furnaces are typically different whereby the combustion air and exhaust gases are at different temperatures. The furnaces also differ in the number and configuration of firing ports, the production capability of the furnaces, and the amount of electric boosting.

In view of the different furnace designs and the variations in operating conditions, it has generally been difficult in the industry to theoretically evaluate the performance of a glass furnace. While measurements in a furnace can indicate the performance of the furnace with a given set of operating parameters, a change in a parameter or set of parameters may have a significant impact on the furnace's overall behavior. Since a change in operating parameters may have adverse effects on the furnace and on the refractory, the operating parameters of the furnace should not be changed without a good estimation on how the changes will effect the furnace's behavior. A need therefore exists for a method or system for predicting the behavior of a furnace for a given set of operating parameters and also for a change in the parameters.

A glass furnace produces high concentrations of oxides of nitrogen ($NO_x$) due to the high combustion temperatures required to melt the glass batch materials As with other industries, the glass industry is being forced by increasingly stringent air quality regulations to reduce the emissions of $NO_x$. For glass furnaces, available options for $NO_x$ control are generally either very expensive or have the potential to negatively impact the process. For instance, two $NO_x$ control technologies for glass furnaces which result in only moderate reductions in emissions, such as 40 to 50 percent, are oxygen-enriched air staging (OEAS) and low $NO_x$ burners (LNB). While another common technology, namely oxy-fuel systems, can help glass furnaces achieve up to 90 percent reductions in $NO_x$, oxy-fuel systems are rather expensive. A need therefore exists for a method of achieving high levels of $NO_x$ emissions control in a cost effective manner.

A technology that has not yet been applied to glass furnaces is gas reburning. Gas reburning, in general, is a $NO_x$ control technology which can be used to control emissions from virtually any continuous emission source. Gas reburning is not fuel specific but can be applied to equipment fired with coal, oil, gas, biomass, or waste fuels. Some of the principal applications where gas reburning can effectively be applied are utility boilers, industrial boilers, process heaters, incinerators, furnaces, and kilns. A significant amount of the work in the reburning industry has focused on coal-fired utility boilers where gas reburning has successfully been demonstrated to provide control levels between 60 to 70 percent. The emphasis in reducing emissions in coal-fired utility boilers has been due, in large part, to the need to control acid rain precursors, such as $NO_x$ and $SO_2$.

The addition of a reburning system to a glass furnace, however, alters the temperature profile within the glass furnace and alters the overall thermal process. Before a glass furnace can be designed to have a reburning system, the effects of the reburning system on various aspects of the glass furnace and on the operation of the glass furnace should be determined. These effects include changes in mass flows within the furnace, the effect on the refractory, the effect on the furnace's life-time, the fuel efficiency of the furnace, the effect on the chemistry within the furnace, and the degree of $NO_x$ reduction. A need therefore exists for a method and system for determining the effects of a given reburning system design on the operation of a glass furnace and for determining the mass and energy for each flow within the furnace.

To improve the efficiency of the glass furnace and to maintain high temperatures in a melter, a heat recovery device will often be used to recover heat from the melter flue gases and to provide high air preheat temperatures. Two common recovery devices are a regenerator and a recuperator. A regenerator comprises a stack of refractory bricks or other packing material which receives the products of combustion and a complementary stack which preheats air for combustion. At regular intervals, such as every 15 to 20 minutes, firing ports in the furnace are reversed with exhaust ports. As a result, the air entering the regenerator is preheated to high temperatures by the heated stack of refractory bricks. A recuperator, in contrast, routes the combustion flue gases to the air-side portion of the furnace in order to transfer the heat from the combustion gases to the air entering the furnace. This heat transfer takes place through a solid separator, so the air and flue gas do not mix. Because a given glass furnace may have either a regenerator or a recuperator, a need exists for a system and method for determining the mass and energy of each flow within a furnace and the temperatures within a furnace having either a regenerator or a recuperator. Since a furnace may also have reburning, a need exists for a method and system for determining the mass and energy of each flow and the temperature profile within a furnace having reburning.

SUMMARY OF THE INVENTION

An object of the present invention is to provide a system and method for determining the mass and energy flow rate of the gas streams within various types of furnaces.

Another object of the present invention is to provide a system and method for determining the mass and energy flow rate of the gas streams within a furnace with a changed structural parameter.

Another object of the present invention is to provide a system and method for determining the mass and energy of flows within a furnace with a process variation.

Another object of the present invention is to provide a system and method for determining the mass an(d energy of flows within a furnace that implements reburning.

Additional objects, advantages, and novel features of the invention will be set forth in the description which follows, and will become apparent to those skilled in the art upon reading this description or practicing the invention.

To achieve the foregoing and other objects, a method and system according to a preferred embodiment of the invention determines structural parameters of a furnace, operating conditions, and the individual segments in the gas flow path which together comprise the furnace. The mass and energy for each flow within the furnace is determined by proceeding through the segments of the furnace beginning with a first segment in which primary air is input and ending with a last segment in which flue gas is output to a stack. For each segment along the path, a thermodynamic property is calculated for each mass flow entering the segment and for an unreacted mixture of the entering mass flows. A composition of a reacted flow and its thermodynamic property are determined based on the unreacted flow.

The method and system are preferably used to determine the mass and energy for each flow within a glass furnace. Based on an initial set of calculations, the operating conditions for the furnace are revised and compared to the initial set of operating conditions. The process of calculating the thermodynamic properties and comparing operating conditions is an iterative process which is repeated until the operating conditions differ from a previous set of operating conditions by less than a predefined set of tolerances. With the results converged, the mass and energy values for each flow are accurate for the furnace.

The invention is advantageously able to determine the mass and energy of each flow in the furnace with or without reburning and is also able to determine the amount of heat transfer for furnaces having either a regenerator or a recuperator. Further, the invention is able to determine the behavior of a wide range of furnace types, such as container furnaces, flat glass furnace, or a fiber glass furnace.

BRIEF DESCRIPTION OF THE DRAWINGS

The accompanying drawings, which are incorporated in and form a part of the specification, illustrate certain preferred embodiments of the present invention and, together with the description, serve to explain the principles of the invention. The drawings are not necessarily to scale, emphasis instead being placed upon clearly illustrating the principles of the invention. In the drawings.

DETAILED DESCRIPTION OF THE PREFERRED EMBODIMENT

Figure 1:
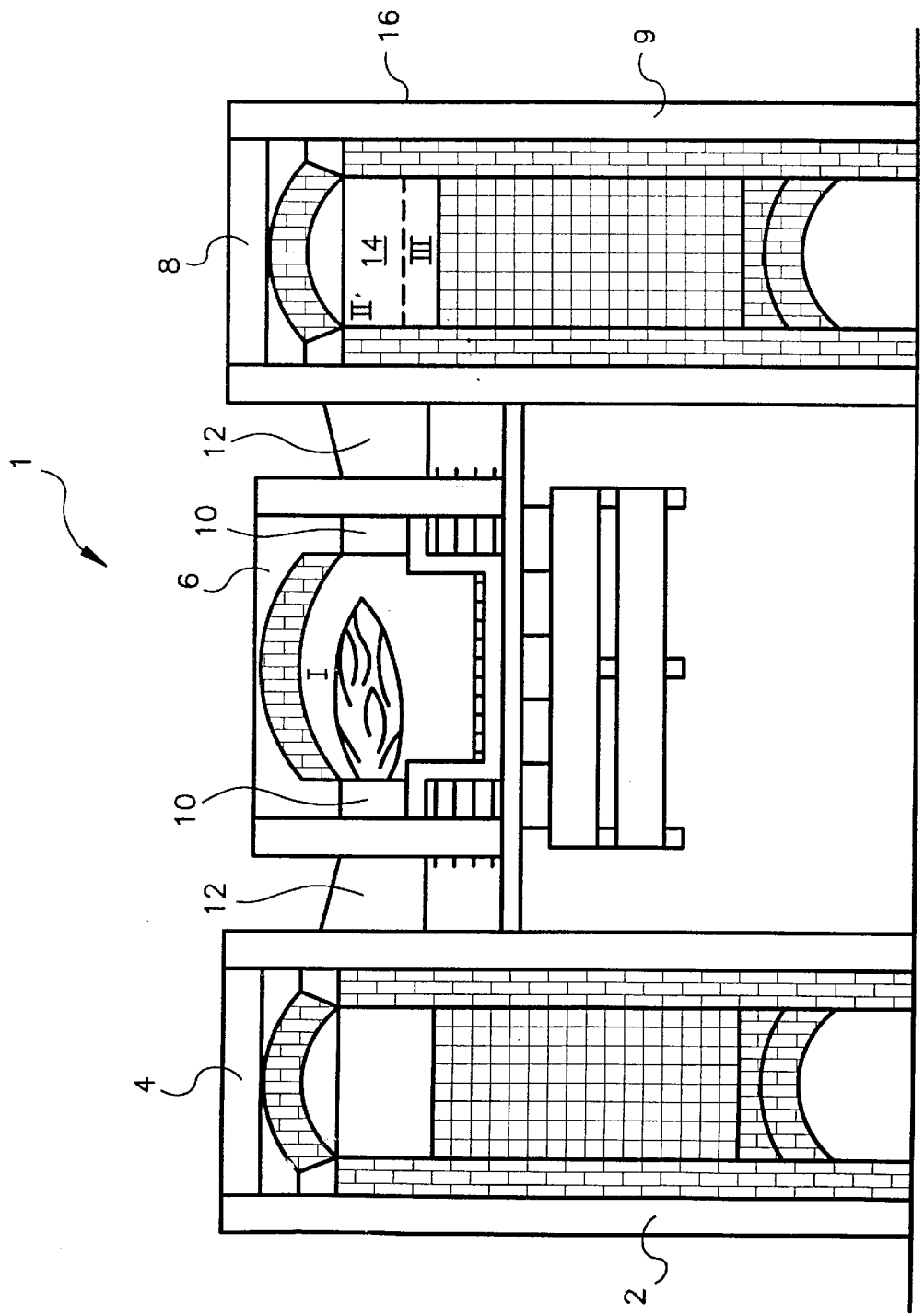
FIG. 1 is a schematic front view of a glass furnace having a twin regenerator.
Figure 2:
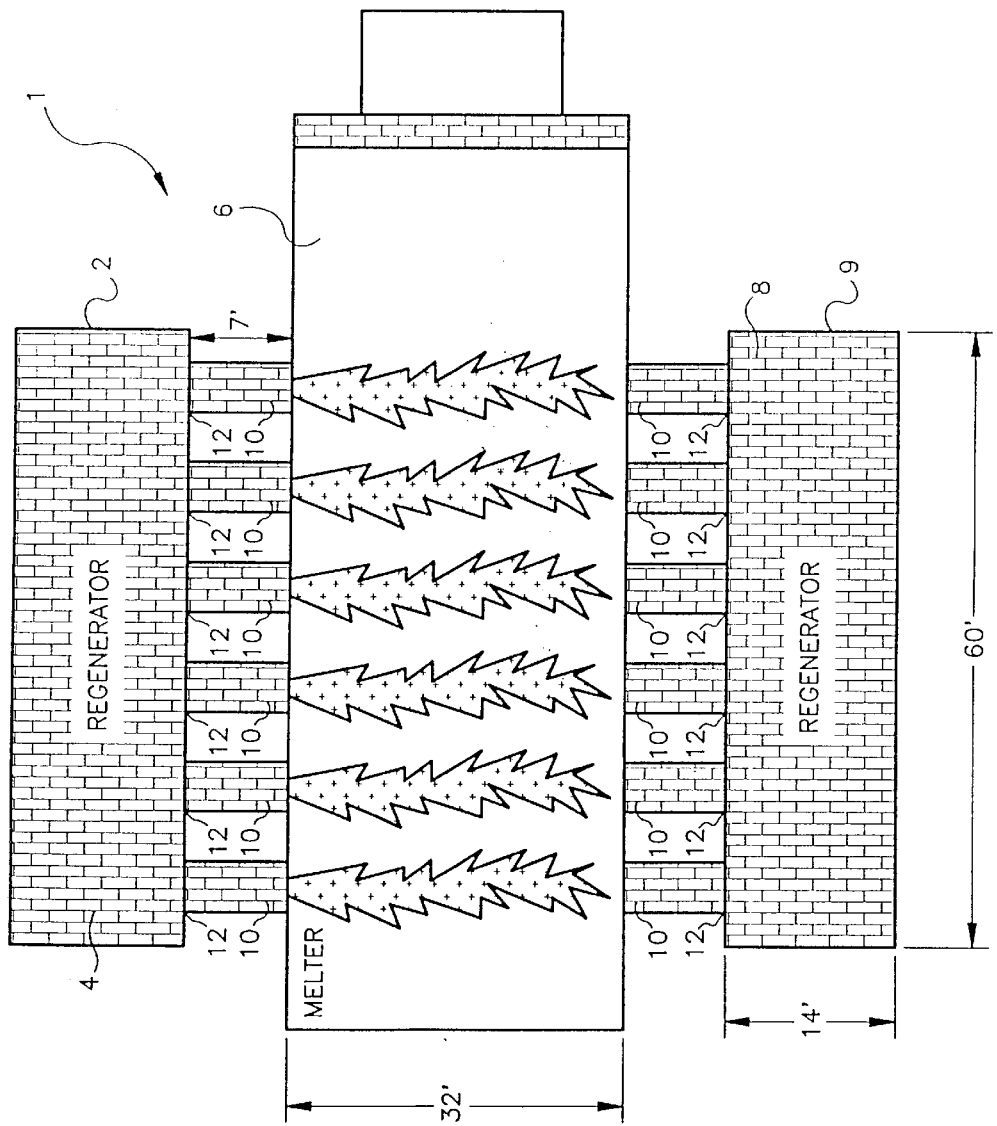
FIG. 2 is a top schematic view of the glass furnace in FIG. 1.

Reference will now be made in detail to the preferred embodiment of the invention. With reference to FIGS. 1 and 2, a typical regenerator glass furnace 1 comprises an air-side regenerator 2, an air-side regenerator crown 4, a melter area 6, a flue-gas crown 8, and a flue-gas regenerator 9. In operation, primary air travels through the air-side regenerator 2 and through the air-side crown 4 to the firing ports 10 on one side of the melter, where the air is mixed with primary fuel, typically natural gas. The air/fuel mixture is combusted within the melter area 6 where the glass is melted. The furnace 1 typically has one to six firing ports 10 per side which are switched every twenty minutes to maintain air preheat. When the firing ports 10 are switched, the main gas flow direction through the furnace reverses with the hot flue side becoming the cold primary air side and the cold primary air side becoming the hot flue side.

While the invention is being described with reference to furnace 1, which is a flat glass manufacturing furnace employing a float glass method, it should be understood that the invention is equally applicable to other types of glass furnaces. For instance, the invention may be directed to either an end port or side port container glass furnace or to a fiber glass furnace. Also, while the furnace 1 is a twin regenerator furnace, the invention may be directed to furnaces which do not have any regenerator or to furnaces which have recuperators.

The reburning fuel is preferably injected into ports 12 opposite the firing side to avoid major impacts on the gas composition or the heat distribution above the melt. While the ports 12 are shown as being at different locations than the ports 10 for injecting the primary fuel, a single set of ports 10 may be used for both injecting primary fuel on the air side during one half of an operating cycle and for injecting reburning fuel when the furnace reverses its operation during the second half of the operating cycle. Also, the location of the ports 10 and 12 may differ from the locations illustrated. In the example shown, the ports 12 are located just upstream of the heat recovery device, namely the regenerator 9, and inject the reburning fuel into the port region 14 following the melt. The overfire air is added with ports 16 located in the crown region 8 above the flue side regenerator 9. The ports 12 for the reburning fuel and the injection of overfire air can be easily added to an existing furnace. The ease in which reburning can be added makes gas reburning ideally suited for retrofitting since the modifications necessary to install the technology are minimized and can be performed without shutting down the furnace.

Figure 3:
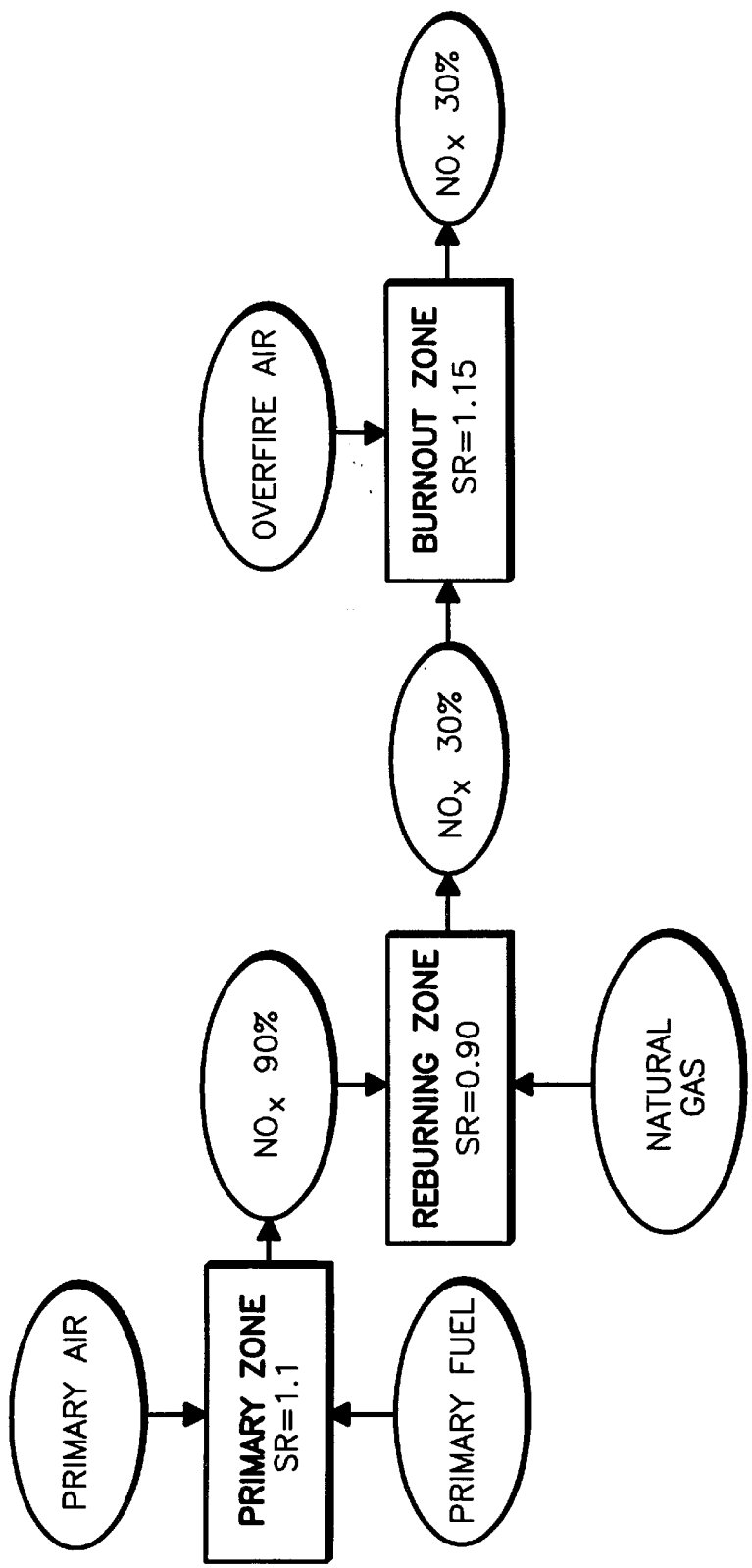
FIG. 3 is a block diagram illustrating a gas reburn process.

With reference to FIG. 3, the reburning process divides the chemical pathway into three zones: a primary zone I, reburn zone II, and burn out zone III. The areas in which the three zones are located have been shown for purposes of illustrating the basic operation of a glass furnace and are not limited to the exact areas depicted. The first zone, or primary zone I, is where fuel from ports 10 and the primary air are fired through the furnace 1 at normal or reduced primary fuel stoichiometry. The level of $NO_x$ exiting zone I is the input to the reburning process.

Figure 4:
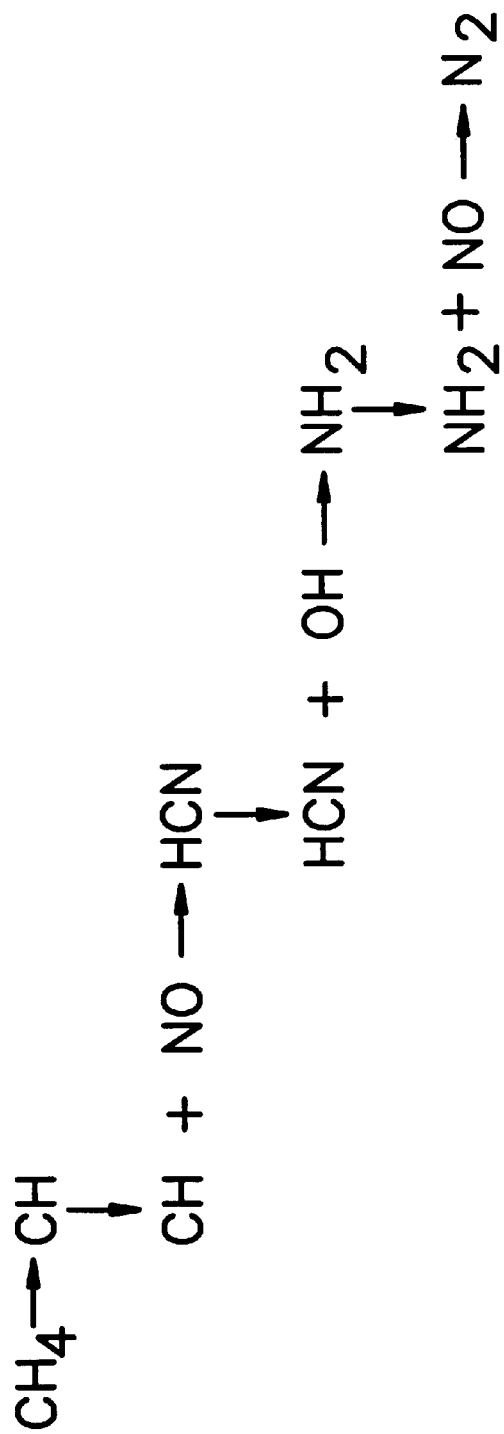
FIG. 4 illustrates a chemical pathway for the destruction of $NO_x$ using a reburning methodology.

In the second zone, the reburn zone II, a small amount of natural gas is injected from the reburn ports 12 downstream of the primary combustion zone to drive the overall stoichiometry slightly fuel rich. Depending upon the primary zone I combustion stoichiometry, the amount of reburning fuel required is typically 10 to 20 percent of the primary zone fuel heat input. With reference to FIG. 4, hydrocarbon radicals formed from natural gas in the fuel rich reburning zone II, primarily CH species, react with NO formed in the primary zone I to form other reduced nitrogen species, such as HCN and NH3. Once formed, these reduced nitrogen species rapidly react with the remaining primary NO molecules to form molecular nitrogen N2.

In the third zone, the burn out zone III, the overfire air is injected at ports 16 to produce overall fuel lean conditions and to complete oxidation of all remaining fuel fragments. In this final zone, the fixed nitrogen species, including $NH_3$, HCN, and NO, will primarily either be oxidized to $NO_x$ or be reduced to molecular nitrogen $N_2$.

A wide range of process parameters influence overall $NO_x$ reductions and must be specified in a reburning application but not all of the parameters are of first order importance. Studies performed by Energy and Environmental Research Corporation, U.S.A., under funding from the U.S. Environmental Protection Agency, the Gas Research Institute, and the U.S. Department of Energy, have shown that the performance of the reburning process is primarily controlled by the stoichiometric ratio of the reburning zone II, the extent of mixing of the reburning fuel, the temperature of the reburning zone II, and the initial $NO_x$ level. Reference may be made to Energy and Environmental Research Corporation, "Glass Tank $NO_x$ Emission Control with Gas Reburn," Topical Report GRI-94/0018.2, Gas Research Institute, Chicago, March 1994 for details on these studies. Long reburning zone residence times, high temperature combustion gases, and high initial $NO_x$ all work to enhance the amount of $NO_x$ reduction achievable with gas reburning. These characteristics are well matched in glass furnaces because of their typical operating conditions and the large post-melter cavities of the furnace ports and regenerator crown.

Although the temperatures and mass flows within a furnace may be detected during its operation, the change in temperature, mass flow rate, and energy for each flow associated with the addition of a reburning system is not easily detected. The mass flows and thermal profile within a furnace is significant for several reasons. As stated above, the amount of $NO_x$ reduction is dependent upon the length of reburning zone residence times, the temperature of the combustion gases, and the initial $NO_x$ levels. The thermal profile and the mass flows are also significant as they can have an effect on the refractory, the furnace's life-time, the fuel efficiency, and the chemistry within the furnace.

Figure 5:
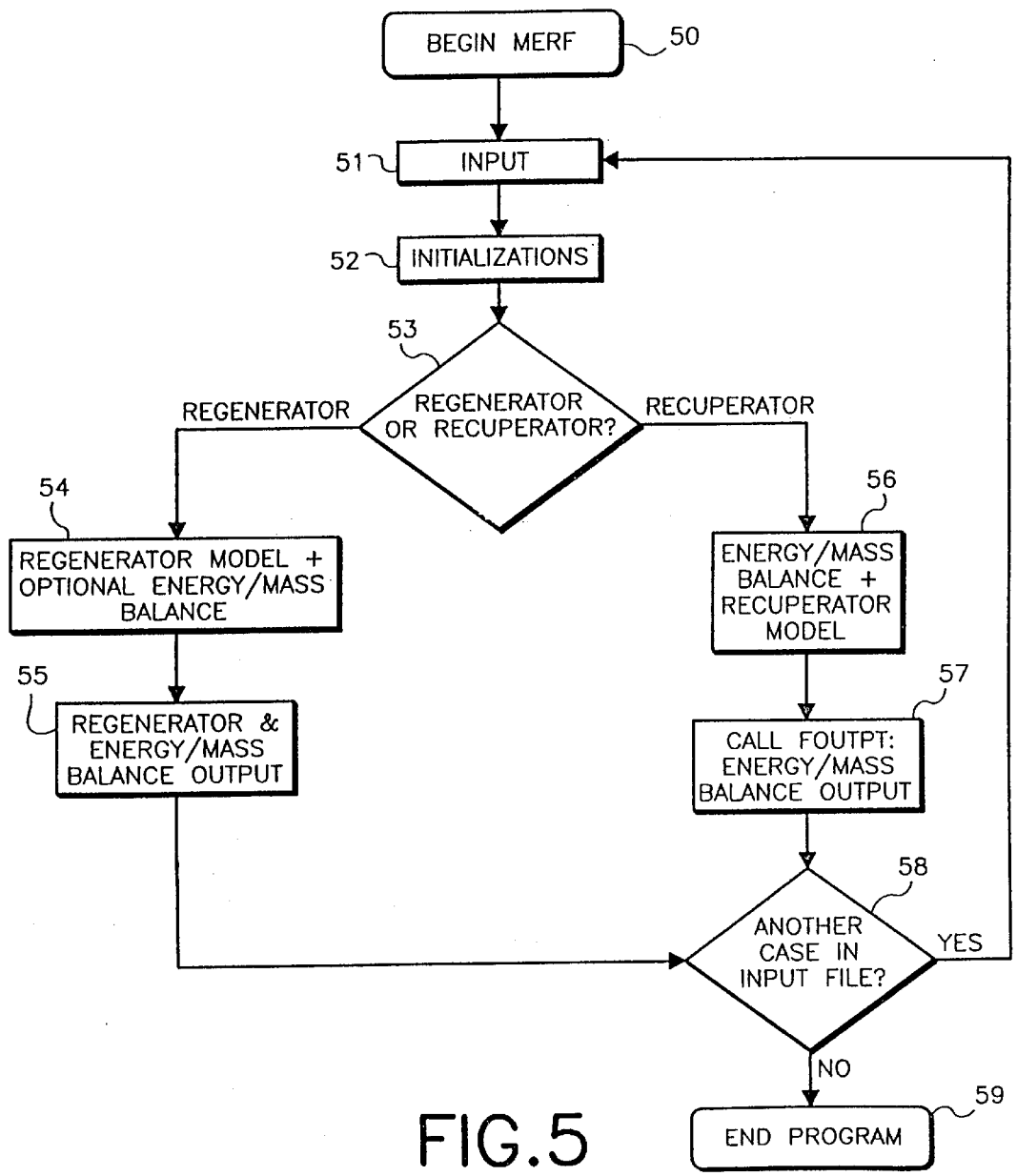
FIG. 5 is an overall flow chart for predicting the behavior of a furnace.

An overall method for determining the thermal profile and the mass and energy for each flow within a furnace is depicted in FIG. 5 with code for a software program being provided in the Appendix. The thermal quantities calculated by the program are actually enthalpy and enthalpy flow rate which is the product of mass flow rate and the enthalpy of the material in the stream. In this description, terms such as "energy" and "heat" may be used synonymously in context. The software program, as should be apparent from the Appendix, is preferably in the commercially available and well known Fortran 77, but may be implemented in any suitable programming language. The flow charts of the method have been illustrated in the figures so that each step which is depicted with a shadowed block is described in more detail in a subsequent flow chart. Also, subroutines and variables in the code have been referenced in the flow charts as six (or fewer) letter words with the words written in all capital letters.

With reference to FIG. 5, the method for predicting the Mass and Energy in a Regenerative or Recuperative Furnace (MERF) begins at step 50. At step 51, the name of an input file containing all of the input parameters is entered through a keyboard and all of the input parameters are read from the input file. Next, initial calculations, such as boundary conditions, and initial temperature profile estimates, are performed at step 52. While the input parameters are preferably located in a data file, the method of the invention could conceivably be practiced by the manual entry of each input parameter through the keyboard. Other variations in the entry of input parameters and in initializing the system should be apparent to those of ordinary skill in the art.

With the invention, a furnace can optionally have one heat exchanger and the heat exchanger can be either a regenerator or a recuperator. At step 53, the type of heat exchanger is determined and processing is routed accordingly. If the heat exchanger is a regenerator, then at step 54 the heat transfer of the furnace is modeled as a regenerator and the mass and energy balance may optionally be performed. In general, the regenerator model provides a time-dependent one-dimensional temperature profile within the regenerator and the mass and energy balance routine calculates the mass and energy balance for each flow within a furnace. At step 55, the results of the regenerator model and the mass and energy balance are output. If, on the other hand, the furnace has a recuperator, then processing is routed to step 56 where the mass and energy balance is performed on a recuperator model of the furnace. The results of the mass and energy balance for the recuperator model of the furnace are output at step 57.

At step 58, a determination is made as to whether another case is listed in the input file. The other case can advantageously rely upon the results obtained during the first pass through the flow chart of FIG. 5. The other case, for instance, may vary from the first case by a single changed parameter, such as a changed input temperature, changes in fuel or oxidant composition, change in stoichiometry, or a change in a furnace design parameter. The other case could also be a process modification, such as the addition of a reburning system. The invention can therefore provide baseline conditions of a furnace and then indicate the effects the addition of a reburning system has on the furnace. After all cases in the input file have been predicted, processing ends at step 59.

Figure 6:
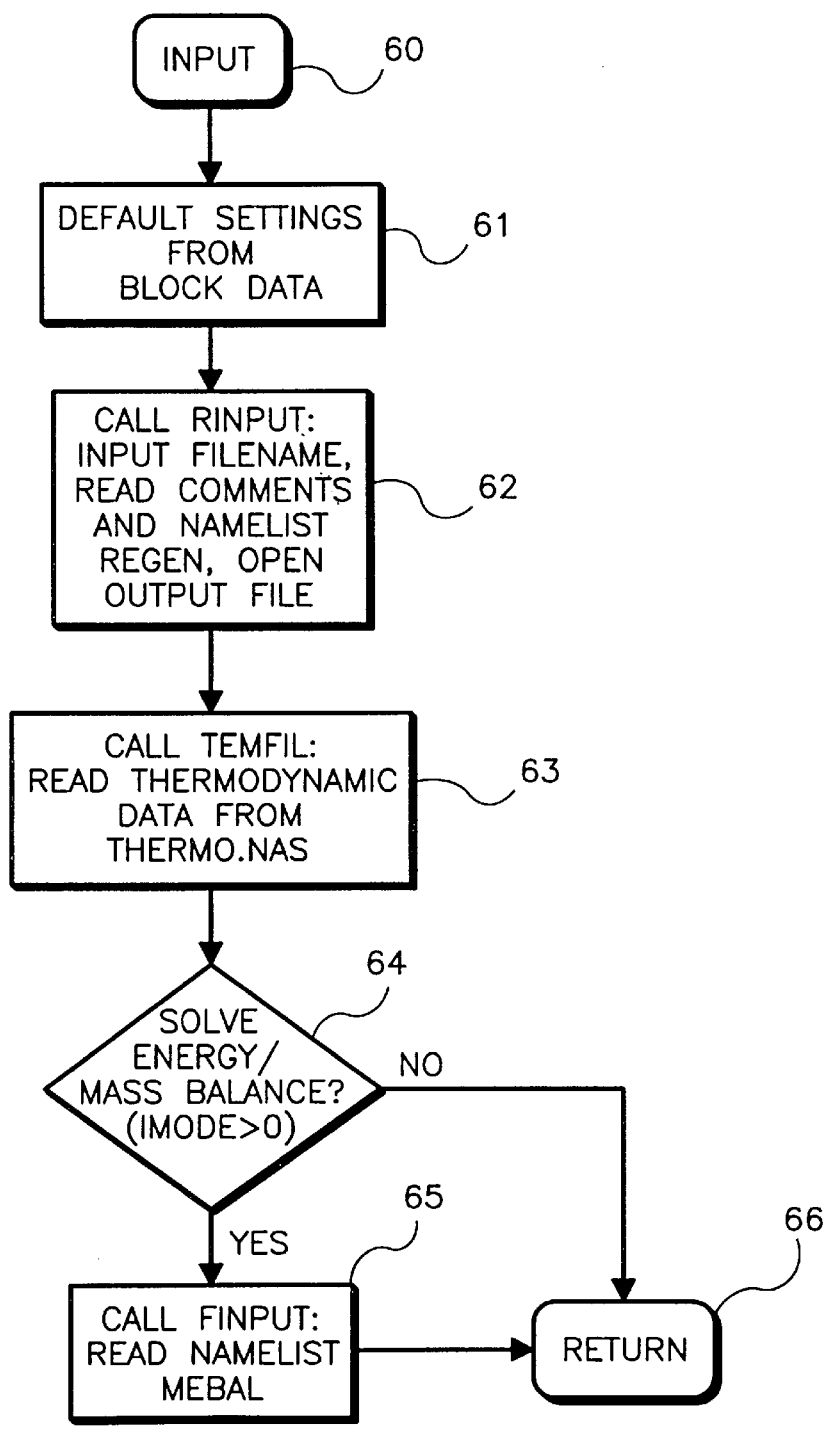
FIG. 6 is a flow chart for inputting operating conditions.

A more detailed flow chart for the process of inputting data is shown in FIG. 6. The process begins at step 60 followed by the entry of default settings for various parameters at step 61 with a BLOCK DATA routine. Some of the parameters which are set to default settings are parameters which typically are not varied from one case to another case. Other default settings provide users with suggested values for input parameters. The default settings also serve as dummy values to avoid arithmetic errors or undefined values when calculations begin. With step 62, a routine RINPUT is executed which first requests the name of an input file from the user. The parameters in the input file are preferably read with Namelist REGEN using the NAMELIST command, a Fortran 77 extension or command which relaxes the formatting requirements of the input file.

Next, at step 63, a routine THMFIL is executed for reading a thermodynamic data file THERMO.NAS. The thermodynamic data file THERMO.NAS is preferably in a standard National Aeronautical and Space Administration (NASA) format which specifies the thermodynamic properties of each species, such as the heat capacity, as a function of temperature. The thermodynamic properties of the species are defined according to a polynomial curve and the parameters for the polynomial curve are contained within the THERMO.NAS file.

In the current implementation, the format is a modification of the format described in S. Gordon and B. J. McBride, "Computer Program for Calculation of Complex Chemical Equilibrium Compositions, Rocket Performance, Incident and Reflected Shocks, and Chapman-Jouguet Detonations," NASA SP-273, Interim Revision March 1976, NASA Lewis Research Center, which is hereby incorporated by reference. For the current implementation, the species are oxygen $O_2$, nitrogen $N_2$, carbon dioxide $CO_2$, water vapor $H_2O$, and methane $CH_4$. The invention, however, is not limited to just these species and other species can be added.

If, as determined at step 64, the mass and energy balance is being solved, then at step 65 the routine FINPUT is called in order to read parameters for the mass and energy balance model, which are read with Namelist MEBAL. If the mass and energy balance is not being solved, then the routine returns at step 66 to the main routine in FIG. 5.

The various inputs for the Namelist REGEN are listed in Table A and the inputs for Namelist MEBAL are listed in Table B. In the tables, the name, a brief description, and the units and/or default values for each variable are listed. For instance, the first variable listed is IMODE which is the program operation mode. The default value of IMODE is 1 whereby the method, by default, will determine the baseline mass and energy balance. A value of 0 for IMODE is used when only the regenerator model is predicted and a value of 2 for IMODE is used when the mass and energy balance is performed on a furnace having a reburning system. Also, for all arrays dimensioned by gas species, the index values for oxygen, nitrogen, carbon dioxide, water vapor, and methane are respectively 1 to 5.

Some input parameters cause the input values of other input parameters to be owerwritten.

TABLE A

| Variable | Description | Units; [Default Values] |
|---|---|---|
| Control Parameters | | |
| IMODE | Program Operation Mode<br>0 = Regenerator only<br>1 = Baseline Mass/energy balance<br>2 = Reburn Mass/energy balance | [1] |
| IWLMOT | Regenerator Model<br>(0 = Hausen,<br>1 = Willmott) | [0] |
| IPROP | Property calculation<br>0 = Constant properties and input h.t. coefficients<br>−1 = One-time heat transfer coefficients calculation,<br>1 = Local temperature - dependent property calculation | [0] |
| ICOLD | Cold start option<br>0 = Make initial guess of steady state profile<br>1 = Begin with regenerator uniform at minimum inlet temperature | [0] |
| IRESET | Option to reset regenerator temperature profile before each regenerator model calculation (1 = Reset, 0 = Don't reset) | [0] |
| IHX | Heat exchanger model<br>(0 = Regenerator, | [0] |

TABLE A-continued

| Variable | Description | Units; [Default Values] |
|---|---|---|
| Control Parameters | 1 = Recuperator) | |
| Regenerator Dimensions | | |
| NX | Number of locations along regenerator (including boundaries) | Max = 401; [10] |
| NT1 | Number of time locations during first (flue gas) period | Max = 51; [10] |
| NT2 | Number of time locations during second (preheat) period | Max = 51; [10] |
| MAXRIT | Maximum number of Regenerator Iterations per Mass/Energy iteration | [100] |
| Time Scale | | |
| TAUTOP | Total time of 1st (flue gas) period: "flow from top" | sec. |
| TAUBOT | Total time of 2nd (preheat) period: "flow from bottom" | sec. |
| Geometrical Dimensions | | |
| RLEN | Regenerator Length (in flow direction) | m |
| RWIDE | Regenerator Width (perpendicular to flow direction) | m |
| RDEEP | Regenerator Depth (perpendicular to flow direction) | m |
| Boundary Conditions | | |
| TEMTOP | Inlet temperature during flow from top (1st period) | Kelvin |
| TEMBOT | Inlet temperature during flow from bottom (2nd period) | Kelvin |
| FLOWT | Mass flow from top (array as function of time) | kg/s |
| FLOWB | Mass flow from bottom (array as function of time) | kg/s |
| COMPT | Composition array for FLOWT (array in time, species) | mole frac.; [dry air] |
| COMPB | Composition array for FLOWB (array in time, species) | mole frac.; [dry air] |
| TAUT | Times at which values of FLOWT, COMPT arrays are given | sec. |
| TAUB | Times at which values of FLOWB, COMPB arrays are given | sec. |
| NPR1 | Number of values in FLOWT, COMPT, TAUT arrays | Max = 10; [1] |
| NPR2 | Number of values in FLOWB, COMPB, TAUB arrays | Max = 10; [1] |
| Control Parameters Checker Packing (Geometric Parameters) | | |
| RATVOL | Ratio of Solid Volume to total regenerator volume (Blockage) | |
| RATSVB | Ratio of Solid Surface (portion exposed to gas) to Solid Volume | 1/m |
| BTHICK | Brick Thickness BTHICK currently HARDCODED (not in NAMELIST) at 0.0762 m = 3 in | m |
| Physical Properties of Checkers | | |
| CONDB | Thermal Conductivity | W/m-K |
| CPSOL | Heat Capacity | J/kg-K |
| RHOSOL | Density | kg/m$^3$ |
| EMISSW | Surface Emissivity | [0.0] |
| Physical Properties of Gas | | |
| CONDG | Thermal Conductivity | W/m-K |
| CPGAS | Heat Capacity | J/kg-K |
| RHOGAS | Density | kg/m$^3$ |
| DVISCG | Dynamic Viscosity | kg/m-s |
| PRESS | Pressure | atmospheres; [Default = 1 atm.] |
| Heat Transfer Parameters | | |
| HCAVGT | Average Heat Transfer Coefficient in 1st (Flow from Top) Period | W/m$^2$-K |
| HCAVGB | Average Heat Transfer Coefficient in 2nd (Flow from Bottom) Period | W/m$^2$-K |
| QREGT | Average Heat Flux to Regenerator checkers during 1st Period | W |
| QREGB | Average Heat Flux to Regenerator checkers during 2nd Period | W |
| HFUDGE | Factor to multiply correlation for estimating convective heat transfer coefficient | [1.0] |
| Output Parameters | | |
| FILOUT | Output Filename | [REGEN.OUT] |
| NPX | Number of X values for X column option | [0] |
| NPT1 | Number of T values in period 1, for T column option | [−1] |
| NPT2 | Number of T values in period 2, for T column option | [−1] |
| NCOL | Number of columns in output file | [8] |
| XPRN | Array of X values for X column option | m |

TABLE A-continued

| Variable | Description | Units; [Default Values] |
|---|---|---|
| Control Parameters | | |
| TPRN1 | Array of time values (period 1) for T column option | sec. |
| TPRN2 | Array of time values (period 2) for T column option | sec. |

TABLE B

| Variable | Description | Units; [Default Values] |
|---|---|---|
| Control Parameters | | |
| MAXFIT | Maximum number of Mass/Energy Iterations | [100] |
| ITREB | Switch between Reburn Melter Models: 0 = Keep melter Heat Loss Same as before 1 = Set Flue Gas Melter Exit Temp. (TFEXIT), adjusting primary heat input | [0] |
| Energy/Mass Balance Parameters | | |
| FFLO | Mass flow rate of each (segment, stream) | kg/s; [0] |
| TFLO | Temperature of each (segment, stream) | Kelvin; [300] |
| FMOL | Mole Fraction of each (segment, stream, species) | mole fraction; [dry air] |
| QLOST | Total Heat Loss Rate in each (segment) | W; [0] |
| QXFER | Total Heat Transfer Rate (e.g. to regenerator or melt) in each (segment) | W; [0] |
| Reburn Parameters | | |
| SRPRM | Air/fuel stoichiometric ratio in primary zone | |
| SRRBN | Air/fuel stoichiometric ratio in reburn zone | |
| SRBOA | Air/fuel stoichiometric ratio in burnout zone (before air leakage) | |
| OFSPRM | Stoichiometric oxidant/fuel mass ratio for primary fuel | |
| OFSRBN | Stoichiometric oxidant/fuel mass ratio for reburn fuel | |

TABLE B-continued

| Variable | Description | Units; [Default Values] |
|---|---|---|
| Control Parameters Energy/Mass Balance Coordinates | | |
| IMELT | Segment of Melter | [4] |
| JMELT | Stream of Batch Gases in Melter | [3] |
| IREGB | Segment of Preheat (Flow from Bottom) Regenerator | [1] |
| IREGT | Segment of Flue Gas (Flow from Top) Regenerator | [7] |
| ICRNB | Segment of Preheat-side (Flow from bottom) Regenerator Crown | [2] |
| ICRNT | Segment of Flue Gas-side (Flow from top) Regenerator Crown | [6] |
| IPRA, JPRA | Segment, stream of main primary air flow inlet | [1, 1] |
| IPRM, JPRM | Segment, stream of primary fuel inlet | [3, 2] |
| IRBN, JRBN | Segment, stream of reburn fuel inlet | [5, 2] |
| IBOA, JBOA | Segment, stream of burnout air inlet | [5, 3] |
| IBAP, JBAP | Segment, stream of burnout air preheat inlet | [1, 3] |
| IBAH, JBAH | Segment, stream of point at which preheated burnout air is removed (to be diverted directly to IBOA, JBOA) | [2, 2] |
| Heat Transfer (and related) Parameters | | |
| HAREC | For the product of (heat transfer coeff*heat exchange area) | W/K |
| TFEXIT | Flue Gas temperature leaving melter [held to set value when IMODE = 1, or IMODE = 2 and ITREB = 1] | K; [1800.] |
| RBOAPH | Ratio of Burnout Air which is preheated (in Preheat Regenerator) | [0.0] |
| RQREG | Ratio of heat lost in Regenerator (each side) to heat transferred in Regenerator | [0.0] |
| RQRCRN | Ratio of heat lost in Regenerator crown to heat lost in regenerator | [0.0] |
| Glass Melter Parameters | | |
| FGLASS | Glass production (mass flow) rate | kg/s |
| RATCO2 | Mass ratio of $CO_2$ evolved from batch divided by glass flow rate | |

TABLE B-continued

| Variable | Description | Units; [Default Values] |
|---|---|---|
| Control Parameters | | |
| RATH2O | Mass ratio of $H_2O$ evolved from batch divided by glass flow rate | |
| HRGL | Heat of reaction of glass batch | J/kg |
| CPGL | Heat capacity of glass melts | J/kg-K |
| TFEED | Batch temperature entering melter | Kelvin |
| TMELT | Melt temperature leaving melter | Kelvin |
| QELEC | Rate of energy transfer from electric boost | W |
| Numerical Parameters | | |
| TOLBEG | Initial convergence tolerance for regenerator temperature | K; [10.0] |
| TOLEND | Final convergence tolerance for local regenerator temperature | K; [0.01] |
| RELAX | Relaxation parameter for reburn mass flow adjustment Set value from 0 to 1; Default value recommended | [1.] |
| TFRAC | Relaxation parameter for melter exit temperature in reburn Set value from 0 to 1; Default value recommended | [1.] |
| Simplified Regenerator Parameters | | |
| NLITE | Maximum number of simplified Regenerator iterations | [0] |
| PTPAIR | Perturbation parameter for Primary Air variation (Perturbed primary air mass flow divided by unperturbed primary air mass flow) | [1.5] |
| PTTFEX | Perturbation parameter for Furnace Exit Temperature Variation (Perturbed temperature minus unperturbed temperature) | K; [500.] |
| Output Parameters | | |
| FILDMP | Filename to dump Namelist contents at various points in program | [REGEN.DMP] |
| LFLO | Text Labels for FFLO output at each (segment, stream) | |
| LXFER | Text Labels for QXFER output at each (segment) | |
| LLOST | Text Labels for QLOST output at each (segment) | |

Figure 7:
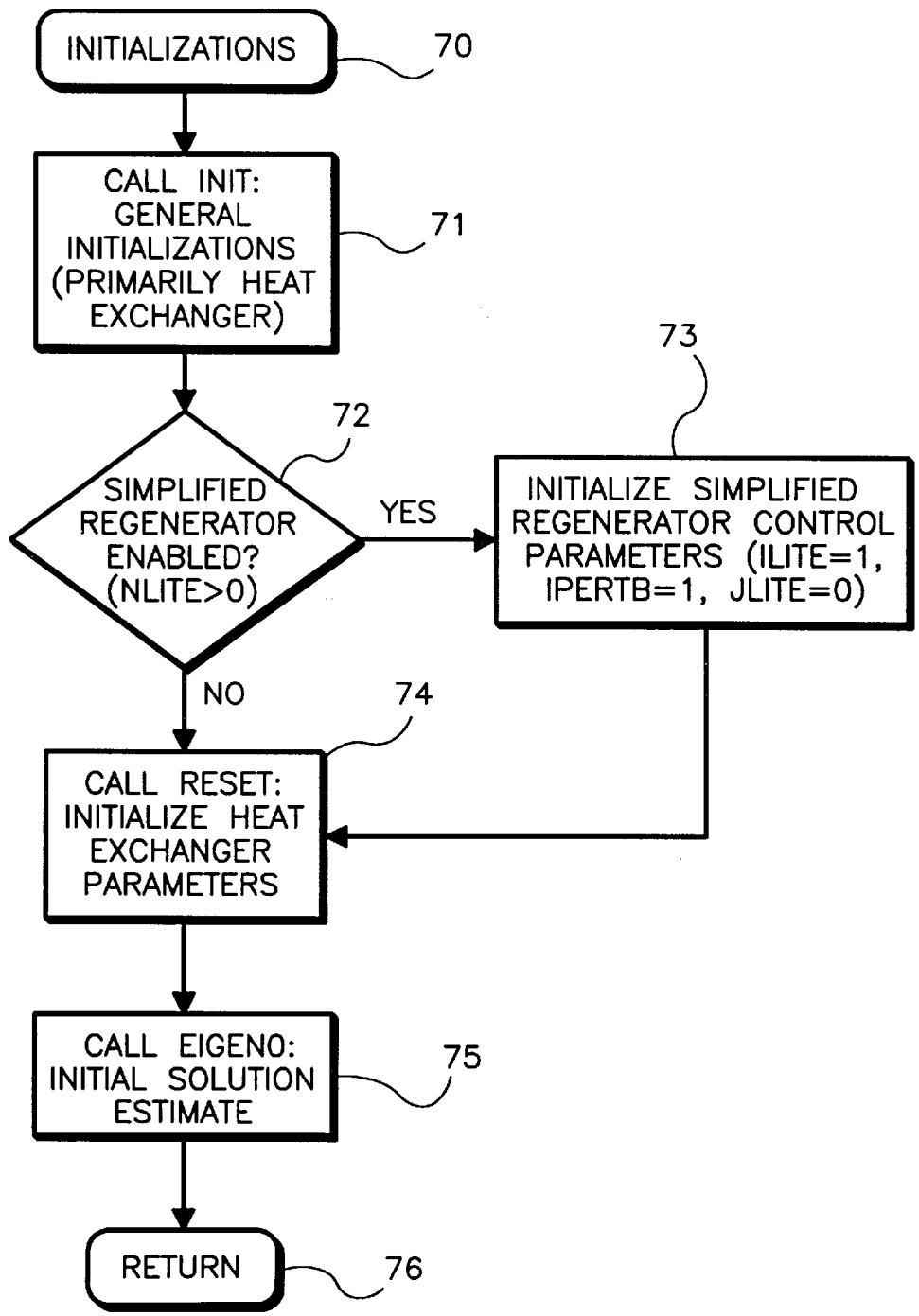
FIG. 7 is a flow chart for performing various initializations.

A detailed flow chart for the step of initializations is shown in FIG. 7. At step 71, a routine INIT is called which performs preliminary calculations on input or default values. INIT evaluates parameters unchanged by, or needed to initiate, the mass and energy balance determination or the regenerator model. If a simplified regenerator is enabled, as determined at step 72, then simplified regenerator control parameters are initialized at step 73. In general, the simplified regenerator model approximates the heat transfer in the regenerator as a linear curve and, based on the linear curve, provides a quick determination of various parameters, such as temperatures, later calculated in detail by the full regenerator model. In certain cases, the simplified regenerator model causes the energy and mass balance to converge faster due to faster regenerator energy balance estimates and thus can save some time in the overall method.

At step 74, a routine RESET is called for initializing parameters which may be revised for each heat exchanger calculation. These parameters include inlet temperatures which represent the thermal boundary condition, weighting factors for distributing mass flow throughout the regenerator cycle, and parameters for evaluating the accuracy of the solution. These initializations are done to prepare for calculation of two-dimensional arrays of regenerator gas temperatures, for which the dimensions represent points in time throughout the regenerator period and distance along the regenerator length. There are two such arrays, one for each half of the regenerator cycle. A routine EIGEN0, representing a "zero eigenmfunction," is called at step 75 to make an initial estimate of the gas temperature arrays. This estimate is a piecewise linear temperature profile, estimated for the middle of the regenerator period. The method then returns at step 76 to the main routine in FIG. 5.

Figure 8:
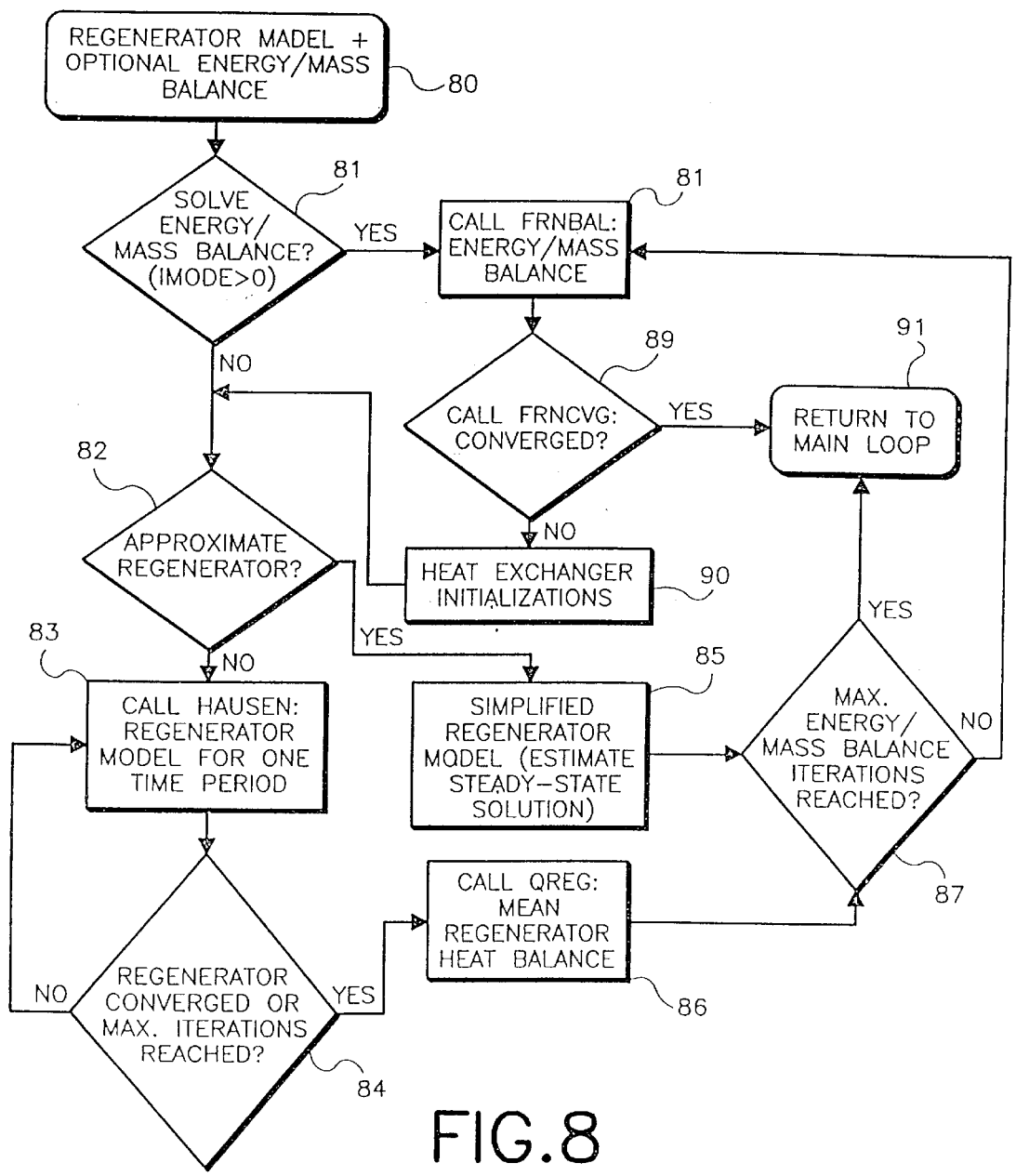
FIG. 8 is a flow chart for modeling a regenerator and for optionally determining an energy and mass balance.

A more detailed flow chart for the step 54 of the regenerator model and optional mass and energy balance is shown in FIG. 8. At step 81, a determination is made as to whether the mass and energy balance is to be solved. If the mass and energy balance are not to be solved, then a determination is made at step 82 as to whether the regenerator is to be approximated with the simplified regenerator model.

When the regenerator is not simplified, then at step 83 a routine HAUSEN is called which contains the full model for the regenerator. The HAUSEN routine provides a temperature profile within the entire length of the regenerator for one time period. The HAUSEN routine begins with an initial temperature profile for the gas and brick and marches through the regenerator for one complete flue gas side hot cycle and one complete air side cold cycle. At the end of the time period, the HAUSEN routine compares the calculated temperatures with the initial temperature profile for each time and for each location and finds the gas or brick temperature which had the largest difference between the two values.

At step 84, the regenerator is considered to have converged when the maximum temperature difference is within a certain tolerance. The tolerance is defined initially by parameter TOLBEG shown in Table B, and in later regenerator calculations by TOLEND, to allow a more stringent final convergence criteria. When the regenerator has not converged, then the HAUSEN routine is called again at step 83 with the calculated results replacing the initial temperature profile. The HAUSEN routine is repetitively called by the loop formed by steps 83 and 84 until the regenerator converges or until a maximum number of iterations within a single regenerator calculation has occurred. The maximum number of iterations should be set fairly high since a number of about one hundred iterations is not uncommon.

The HAUSEN routine uses input data to determine the temperature profile within the regenerator based upon principles described in a book "Heat Transfer in Counterflow, Parallel Flow, and Cross Flow" by H. Hausen which has been translated by M. S. Sayer and then edited by A. J. Willmott, 1983. As shown above in Table A, the regenerator has input data which includes the length, width and depth of the regenerator and the brick dimensions, surface to volume ratio, and volume blockage of the checker, which is the material within the regenerator. The input data also includes operating conditions, such as the flue gas and air streams which may have time dependent temperatures and mass flows Properties of the gas are also taken into consideration, such as the thermal conductivity, heat capacity, density, viscosity, and emissivity. Further, thermal properties of the solids are taken into consideration by the HAUSEN routine, which include the thermal conductivity, heat capacity, density, and emissivity. The heat transfer coefficient is influenced by gas and solid properties as well as geometry.

Some properties are calculated based on the input parameters. Of particular importance is the heat transfer coefficient which may be specified as a constant value by the user or calculated by the program. The program calculation includes a convective and radiative term. The radiative term is calculated based on a method published in Smith et al, "Evaluation of Coefficients for the Weighted Sum of Gray Gas Model," *Transactions of the ASME*, Vol. 104, November 1982, pp. 602–608, which is hereby incorporated by reference. The convective term used in the current embodiment of the invention uses an empirical correlation which is presented in the above-referenced book by Hausen. This correlation allows for the variation of convective heat transfer coefficient with gas stream properties and flow rate as well as regenerator geometrical parameters. The magnitude of the convective heat transfer coefficient may be adjusted by the user using an input scale factor listed in Table A as HFUDGE, to ensure that the regenerator model matches any available heat transfer data, such as temperature measurements, for a specific regenerator of interest. It is recommended that the resulting value of the scale factor then be used for further calculations involving the same regenerator.

Based on the above inputs, a quantity of energy transferred dQ is determined for each differential area df within the regenerator for each differential period of time dt. The energy balance dQ is expressed by the following equation:

$$dQ = -Cdt\left(\frac{\partial \theta}{\partial f}\right)_t df = \overline{\alpha} df (\theta - \Theta_m) dt = dC_s\left(\frac{\partial \Theta_m}{\partial t}\right)_f dt. \quad \text{(EQ. 1)}$$

In summary, the increment of energy transfer dQ is equal to the amount of energy given up by the gas, which is equal to the amount of energy transferred, and to the amount of energy absorbed by the solid. In Equation 1, $\theta$ is the temperature of the gas, $\Theta_m$ is the mean solid temperature, C is the gas thermal capacity, which is equal to $(\dot{m} c_P)_{gas}$, $dC_s$ is the thermal capacity of a solid element, which is equal to $(c_P dm)_{sol}$, $\dot{m}$ is the gas mass flow rate, dm is a differential element of solid mass, $c_P$ is heat capacity, t is time, f is the cumulative surface area from top of regenerator, and $\overline{\alpha}$ a is mean heat transfer coefficient.

Equation 1 can be coupled into the following pair of differential equations:

$$\left(\frac{\partial \theta}{\partial f}\right)_t = \frac{\overline{\alpha}}{C}(\Theta_m - \theta) \quad \text{(EQ. 2)}$$

which represents the gas temperature gradient due to heat transferred through the gas boundary layer, and $$\left(\frac{\partial \Theta_m}{\partial t}\right)_f = \frac{\overline{\alpha} df}{dC_s}(\theta - \Theta_m) \quad \text{(EQ. 3)}$$

which represents the rate of solid temperature change due to heat absorbed into the checker brick. The above two differential equations can be solved as coupled equations or can be rearranged, for example into the following single differential equation for only the mean solid temperature where $\Theta_m$ is abbreviated here as $\theta$:

$$\frac{\partial^2 \Theta}{\partial f \partial t} + \overline{\alpha}\frac{df}{dC_s} \cdot \frac{\partial \Theta}{\partial f} + \frac{\overline{\alpha}}{C} \cdot \frac{\partial \Theta}{\partial t} = 0. \quad \text{(EQ. 4)}$$

The boundary conditions needed to solve the above equations are the gas inlet temperatures and a condition to determine the initial temperature profile for the cycle. For the purposes of this invention, the temperature profile of the solid is assumed to be unchanged during the time that the gas composition and flow direction in each regenerator is switched, between cycles.

A preferred method for determining the temperature profiles is the Willmott method, which is described in the above-referenced book. The Willmott method involves the use of non-dimensional variables defined by the following equations:

$$\Delta \xi \equiv \frac{\overline{\alpha}}{C} \Delta f \quad \text{(EQ. 5)}$$

which is a non-dimensional distance, and $$\Delta \eta \equiv \frac{\overline{\alpha} df}{dC_s} \Delta t \quad \text{(EQ. 6)}$$

which is the non-dimensional time. The non-dimensional distance variable $\Delta \xi$ and non-dimensional time variable $\Delta \eta$ are preferably substituted into the previous equations to determine values of the temperature for a mass flow or solid for a particular interval of time. After the temperatures for the solid and gas flows have been determined for one time interval, the temperatures for the next time period are determined based upon the calculated temperatures from the previous intervals.

Figure 9:
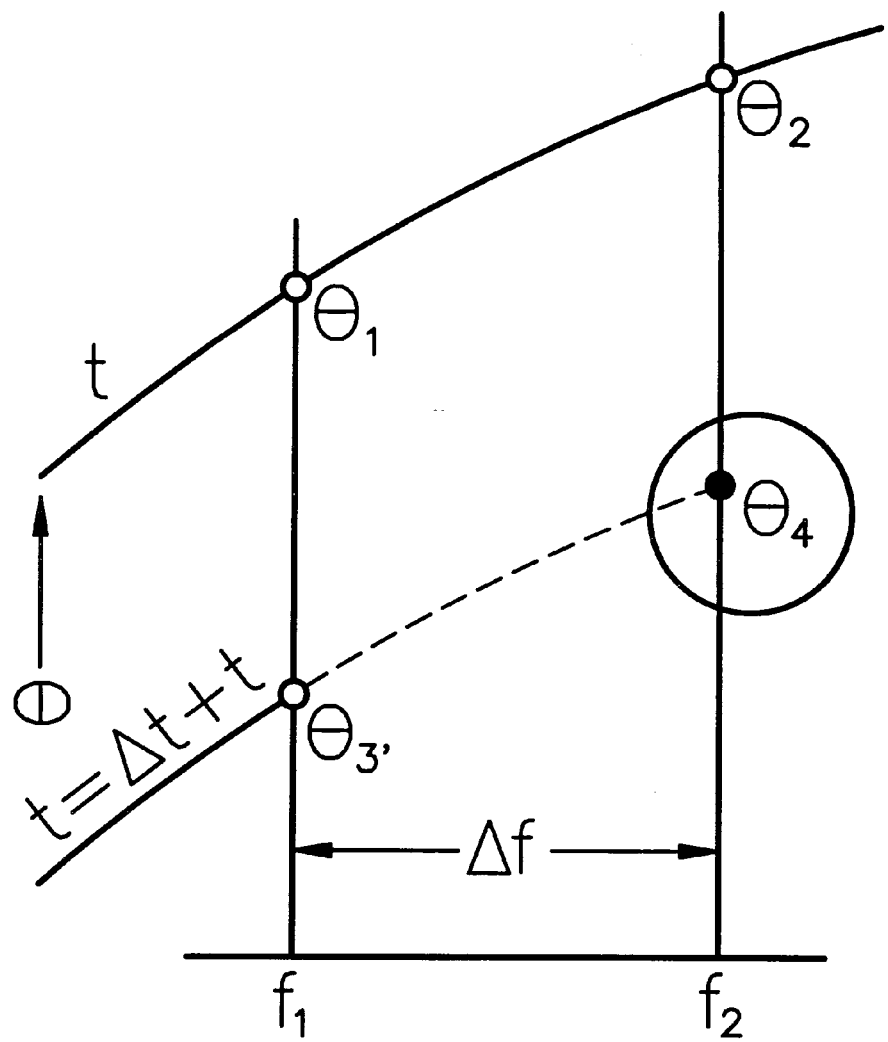
FIG. 9 is a plot of temperature versus location, at two different times, showing three known temperatures and one unknown temperature.

FIG. 9 reprinted from the above-referenced book by Hausen, provides an example of a plot of brick temperatures for a differential space within a regenerator. The temperatures $\theta_1$ and $\theta_2$ of the brick have been previously predicted for locations $f_1$ and $f_2$, respectively, for a period of time t where f is the cumulative brick surface area from the regenerator entrance. The temperature $\theta_3$ has also been determined for space $f_1$ at a period of time t+$\Delta$t. Thus, the unknown in this plot is the temperature $\theta_4$ at space $f_2$ for the period of time t+$\Delta$t. Gas temperatures $\theta^1 \ldots \theta^4$ are also defined for the corresponding locations and times.

Based upon a finite difference approximation of the previous equations and the substitution of the non-dimensional variables $\Delta\xi$ and $\Delta\eta$, the following equation can be determined for the solid temperature $\theta_4$:

$$\theta_4 = \frac{\frac{4}{2+\Delta\xi} \cdot \frac{\Delta\eta}{2+\Delta\eta}(\theta_1 + \theta_3) + \left(\frac{2-\Delta\eta}{2+\Delta\eta} + \frac{\Delta\xi}{2+\Delta\xi} \cdot \frac{\Delta\eta}{2+\Delta\eta}\right)(\Theta_1 + \Theta_2)}{1 - \frac{\Delta\xi}{2+\Delta\xi} \cdot \frac{\Delta\eta}{2+\Delta\eta}} - \Theta_3. \quad \text{(EQ. 7)}$$

After the value for the temperature $\theta_4$ of the solid has been determined, the temperature of the gas $\theta_4$ can be determined from the following equation:

$$\theta_4 = \frac{\Delta\xi}{2+\Delta\xi}(\Theta_1 + \Theta_2 + \Theta_3 + \Theta_4) + \frac{2-\Delta\xi}{2+\Delta\xi}(\theta_1 + \theta_3) - \theta_2. \quad \text{(EQ. 8)}$$

Equations 7 and 8 represent the finite difference equations using the model option referred to as the "Willmott Method." This approach is one of several attributed to Willmott, and uses finite difference approximations of Eqs. 2 and 3, with one of several possible choices of differencing and averaging the four temperatures, shown in FIG. 9. The alternative model option, referred to as the "Hausen Method," uses Eq. 4 and results in a different set of difference equations in $\eta$ and $\zeta$.

Based upon the above-described process, the HAUSEN routine determines the temperature profile within the regenerator for each differential area df along the entire length of the regenerator. The HAUSEN routine also determines the temperature profile for each differential period of time dt throughout the entire period comprising one complete flue gas side hot cycle and one air side cold cycle.

At a step 86 in FIG. 8, a routine QREG is called for determining the mean regenerator heat balance. The routine QREG determines heat transfer quantities including the total amount of heat entering the regenerator at the top, the total amount of heat exiting the regenerator at the bottom, and the total amount of heat absorbed by the regenerator.

If the mass and energy balance is run together with the regenerator model, then at step 88 a routine FRNBAL is called for determining the mass and energy balance of the furnace. At step 89, a determination is made as to whether the results from the mass and energy balance have converged. The routine FRNCVG compares the temperatures, mass flow rates, compositions, and heat flow rate for each segment with the values previously determined to find the largest difference in value for the temperature, mass flow rate, composition, and heat flow rate. The results converge when the differences for each type of parameter are less than certain tolerances. The tolerances to determine whether the results for the mass and energy balance have converged are preferably 0.001 kg/s for mass flow rate, 0.1 Kelvin for temperature, 0.0001 for mole fractions, and within 100 watts for the heat flow rate. As should be apparent, the tolerances can be varied from these preferred values to any suitable set of values. Because FRNCVG is designed to have a previous set of results, the results will not converge until FRNBAL has been called at least two times. When the mass and energy does converge, then processing returns at step 91 to the main routine shown in FIG. 5.

When the results have not converged, as determined at step 89, then the results of the mass and energy balance are used to initialize the heat exchanger at step 90. Next, at step 82, the determination is made as to whether the regenerator is approximated. If the regenerator should not be approximated, then the HAUSEN routine is called at step 83 to determine the temperature profile within the regenerator based on the results from the mass and energy balance, iterated based on the results at step 84, and the mean regenerator heat balance is determined at step 86. If the regenerator should be approximated, then at step 85 the temperature profile is determined from a simplified regenerator model 85 based on the results from the mass and energy balance. If the maximum number of iterations for the mass and energy balance has not been reached, as determined at step 87, then the results from the regenerator model is used by the routine FRNBAL for the next mass and energy balance determination. The maximum number of iterations for the mass and energy balance can be set to any suitable number.

Thus, when the regenerator model is used in conjunction with the mass and energy balance, the mass and energy balance is first solved and the results of the mass and energy balance are converted into inputs for either the full or simplified regenerator model. The full or simplified regenerator model then determines the temperature profile within the regenerator and converts the results into inputs for the mass and energy balance. The mass and energy balance and the regenerator model are repeated until, as determined at step 89, the results converge.

Figure 10:
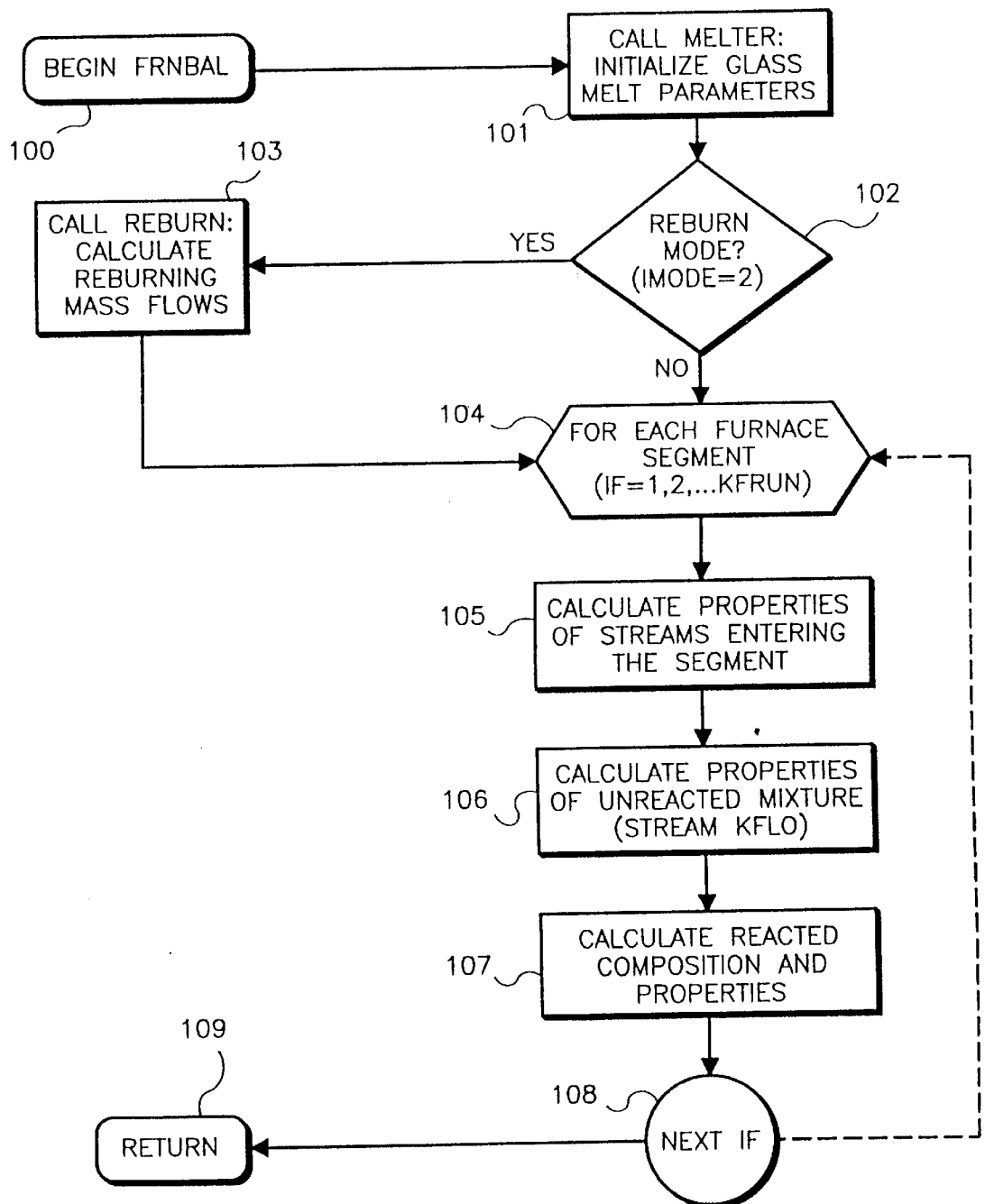
FIG. 10 is a detailed flow chart for determining the energy and mass balance for a furnace.

A more detailed flow chart for the FRNBAL routine is shown in FIG. 10. At step 101, a routine MELTER is called which calculates basic parameters of a melter which do not change. It is assumed that the production capability of the furnace should not change, and so the amount of heat transferred to the glass and the batch gases remain constant. While these parameters typically remain constant for a particular furnace, the parameters could be changed to model different furnace operating conditions or designs if desired.

At step 102, a check is made to determine whether the furnace includes a reburning system. When the furnace is not in the reburn mode, the various mass flows affecting the furnace's operation have already been specified and remain fixed. When in the reburn mode, however, a routine REBURN is called at step 103 to determine the reburning mass flows. The routine REBURN will adjust the primary fuel flow, reburn fuel flow, primary air, and overfire air to achieve a desired stoichiometry profile. The routine REBURN can be run so that either the melter heat flow is the same as the baseline condition or the melter exit temperature is the same.

Figure 11:
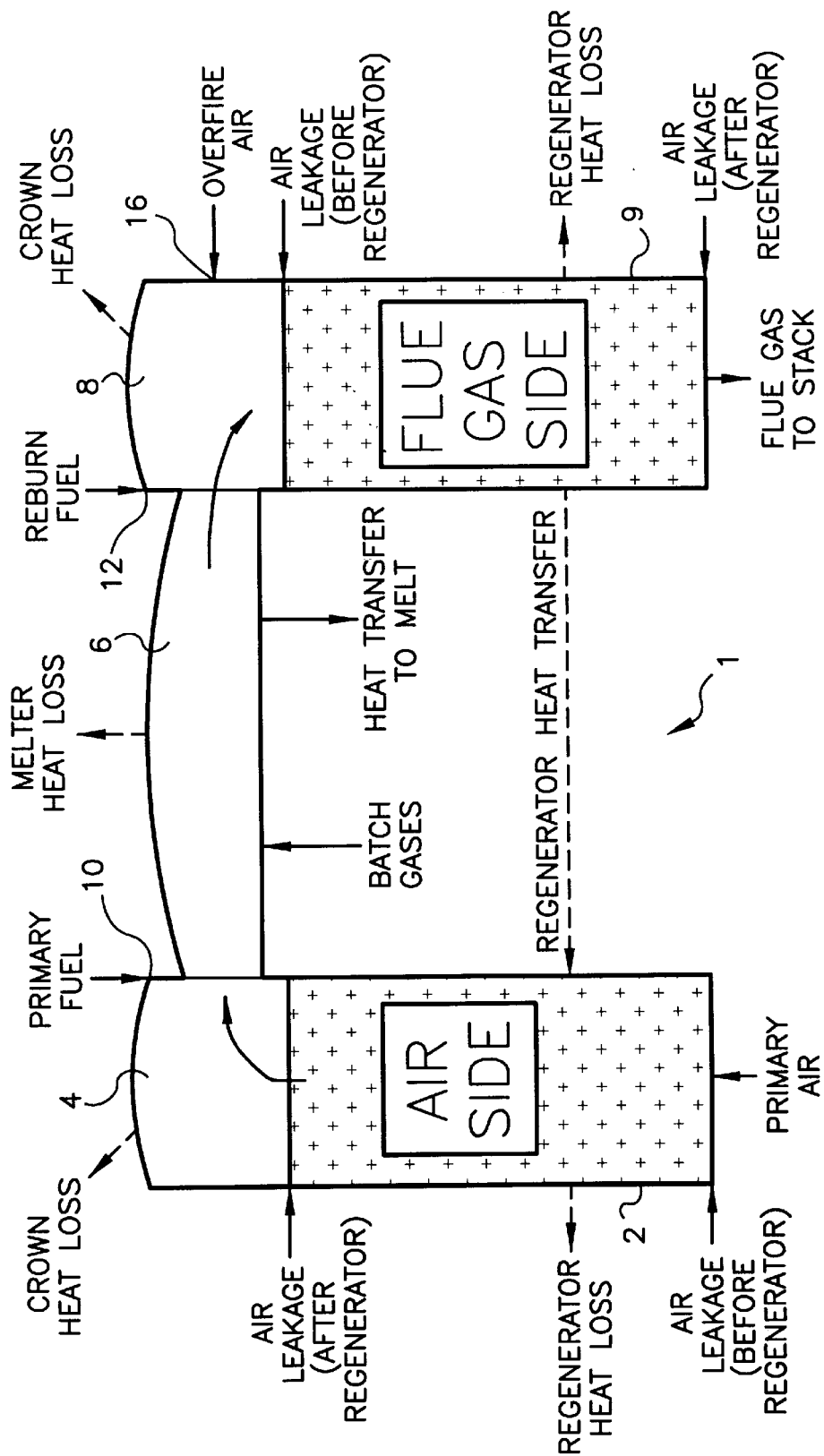
FIG. 11 is a diagrammatic view of a furnace and the energy and mass flows associated with the operation of the furnace.

The mass and energy balance is determined for each segment of a furnace. With furnace 1 as an example and as shown in FIG. 11, the routine FRNBAL determines the mass and energy balance for furnace 1 which has mass flows comprising the primary air entering the air side regenerator 2, the primary fuel entering ports 10, the reburn fuel entering at ports 12, the overfire air entering at ports 16, and the flue gas routed to a stack. Ports 10 and 12 only fire on one side of the melter during each cycle. The operation of the furnace 1 produces mass flows providing the heat transfer to the melt and batch gases. The furnace 1 also has a number of heat losses, such as regenerator heat losses from both the air side regenerator 2 and flue gas regenerator 9, heat loss from the air side regenerator crown 4, melter heat loss, and heat loss from the flue side regenerator crown 8. The furnace 1 further may have air leakage in various locations, such as before or after the air side regenerator 2 and flue gas regenerator 9. In practice, the air side regenerator is less likely to leak in, due to higher pressures than the flue gas side.

The routine FRNBAL determines the mass and energy of each flow by dividing a furnace into segments and successively performing a number of calculations for each segment in the furnace. The furnace 1 in FIG. 11 is typically divided into seven segments: an air side regenerator 2 segment, an air side regenerator crown 4 segment, a primary fuel burning segment, a segment interacting with the melter 6, a reburning fuel and overfire air introduction segment, a flue side crown 8 segment, and a flue side regenerator 9 segment.

Figure 12:
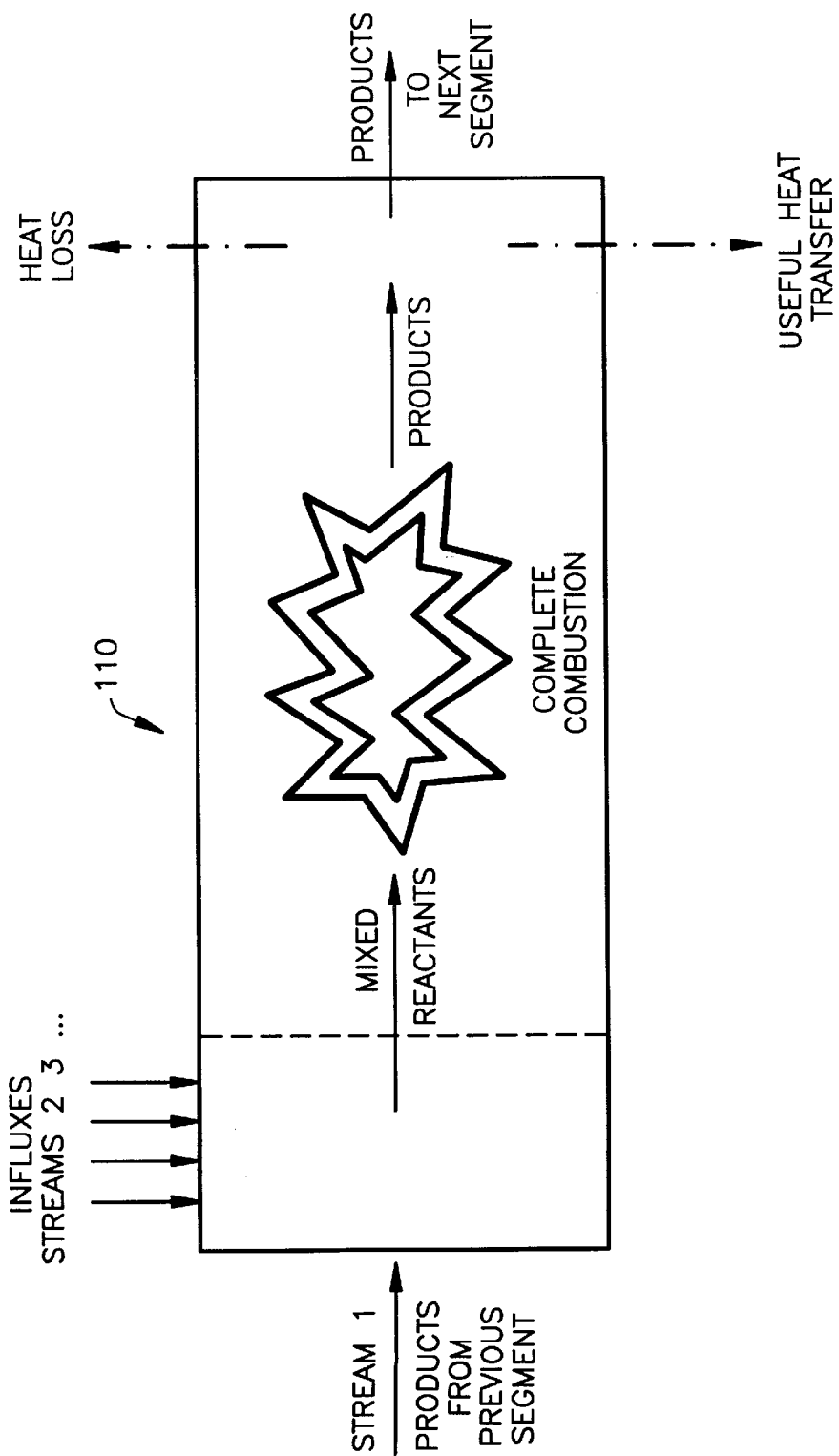
FIG. 12 is a sample segment of a furnace along with its various mass and heat flows.

For each of the segments, the properties of the streams entering the segment are first calculated at step 105. For the purposes of description, a representative segment 110 is shown in FIG. 12. Each segment, such as segment 110, has an input stream, which is Stream 1, and possibly one or more influx streams, which may be called Stream 2, Stream 3, and so forth. Currently, the routine recognizes two input streams per segment, but this number may be easily increased. The parameters describing each stream include temperature, composition, and mass flow which define the enthalpy of the each stream and the total heat content of each stream. At step 106, the properties of the unreacted mixture of all incoming streams are next determined to arrive at a combined flow having a combined total enthalpy. The composition and properties of the composition are then calculated at step 107 based on the assumption that the reactants completely and instantaneously combust to form the products. The heat transfer and heat loss are also determined at step 107 to arrive at the thermal properties of resultant output stream which is supplied to the next segment.

At step 108, the index value for the segment is incremented and processing returns to step 104 for the next segment. The processing continues in this fashion until each segment has been evaluated and the final output stream has been calculated for the last segment. After all segments have been evaluated, processing returns at step 109 to the routine in FIG. 8.

Figure 13:
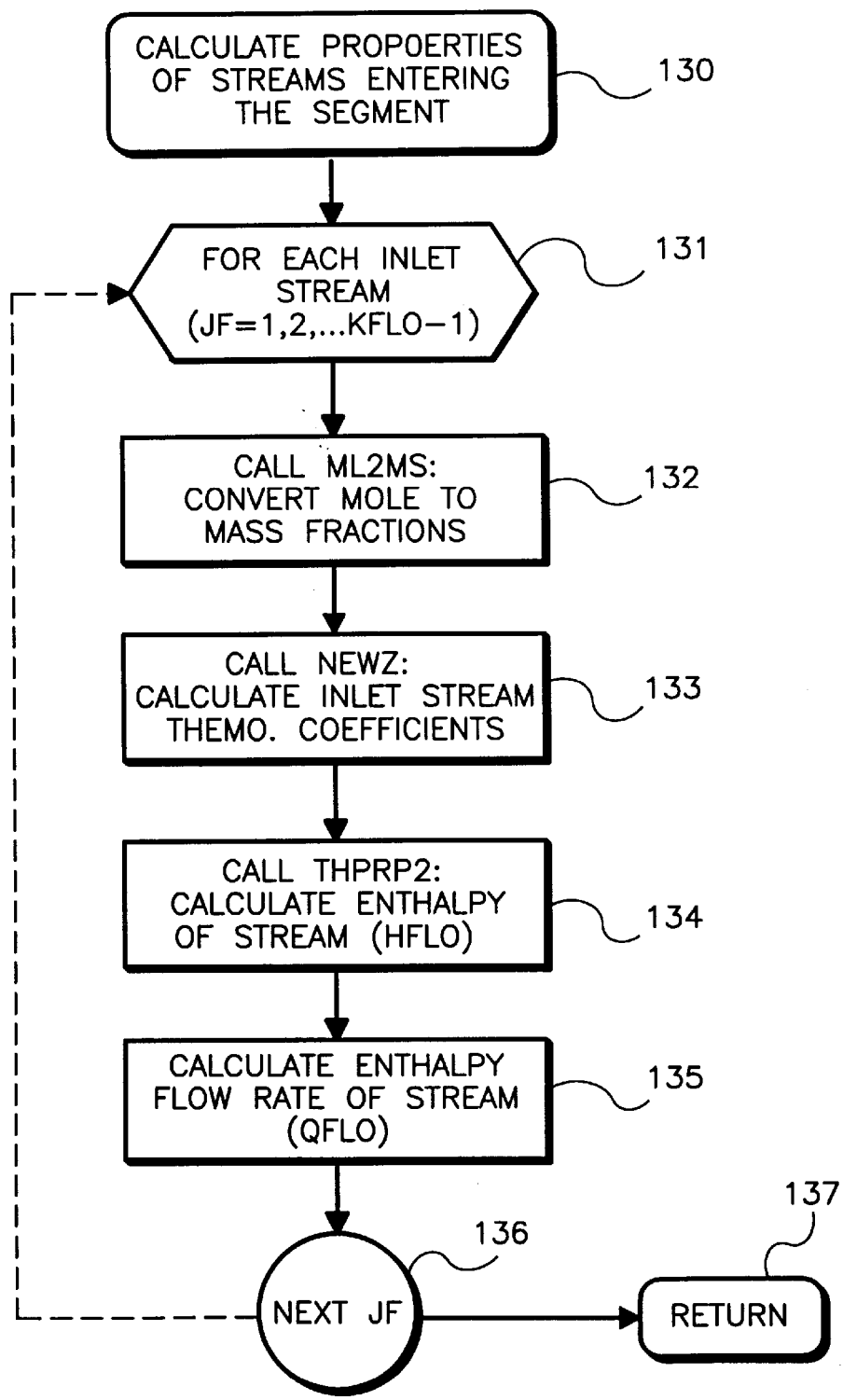
FIG. 13 is a flow chart for calculating properties of streams entering a segment of the furnace.

A detailed flow chart for the step 105 of calculating properties of entering streams is shown in FIG. 13. At step 131, for each stream entering a given segment, a routine ML2MS is first called at step 132 which converts mole fractions of the mass flows to mass fractions. At step 133, a routine NEWZ is called to calculate the thermodynamic property coefficients of the inlet stream through the use of the thermodynamic data file THERMO.NAS, which contains curvefit coefficients for the properties of each species in the gas. At step 134, a routine THPRP2 is called to calculate the enthalpy of the stream (HFLO) based on the thermodynamic coefficients and the temperature of the stream. Finally, at step 135, the total enthalpy flow rate of the stream (QFLO) is determined according to the product of the mass of the flow (FFLO) with the enthalpy of the flow (HFLO). The next stream is selected at step 136 and processing returns to step 131 in order to calculate the properties of the next stream. After the properties have been calculated for all of the inlet flows for a single segment, the processing returns at step 137 to the routine in FIG. 10.

Figure 14:
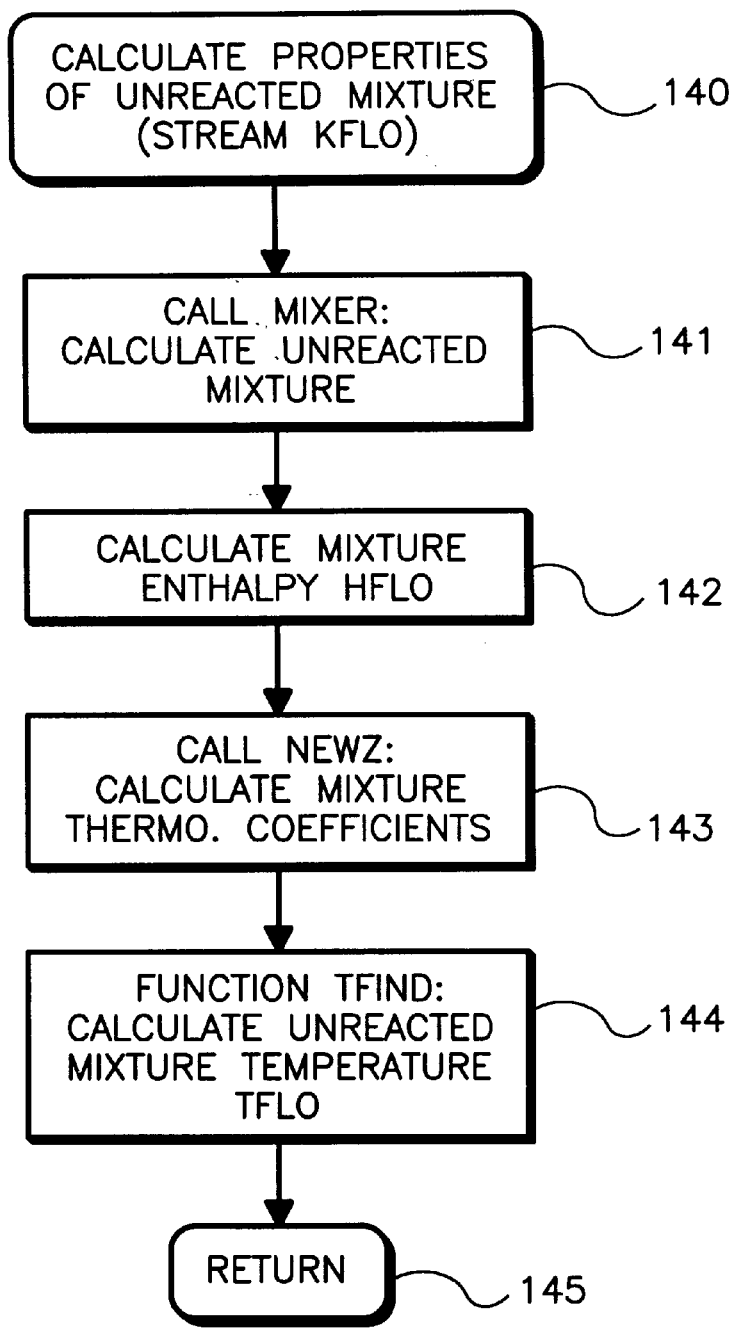
FIG. 14 is a flow chart for calculating properties of an unreacted mixture of streams entering a segment of the furnace.

A detailed flow chart for the step 106 of calculating the properties of the unreacted mixture of flows is shown in FIG. 14. At step 141, a routine MIXER is called in order to calculate the composition of the unreacted mixture. The routine MIXER uses the mass fraction and flow rate of each stream to determine the relative amounts of each species in the mixture. The enthalpy of the mixture is determined at step 142. At step 143, based on the composition of the mixture, a routine NEWZ is called in order to calculate the thermodynamic coefficients of the mixture. A routine TFIND is then invoked at step 144 to calculate the unreacted mixture temperature based on the enthalpy and thermodynamic coefficients of the mixture. The routine TFIND is an iterative routine which finds a temperature at which the calculated mixture enthalpy matches the given enthalpy value. The processing then returns at step 145 to the routine in FIG. 10.

Figure 15:
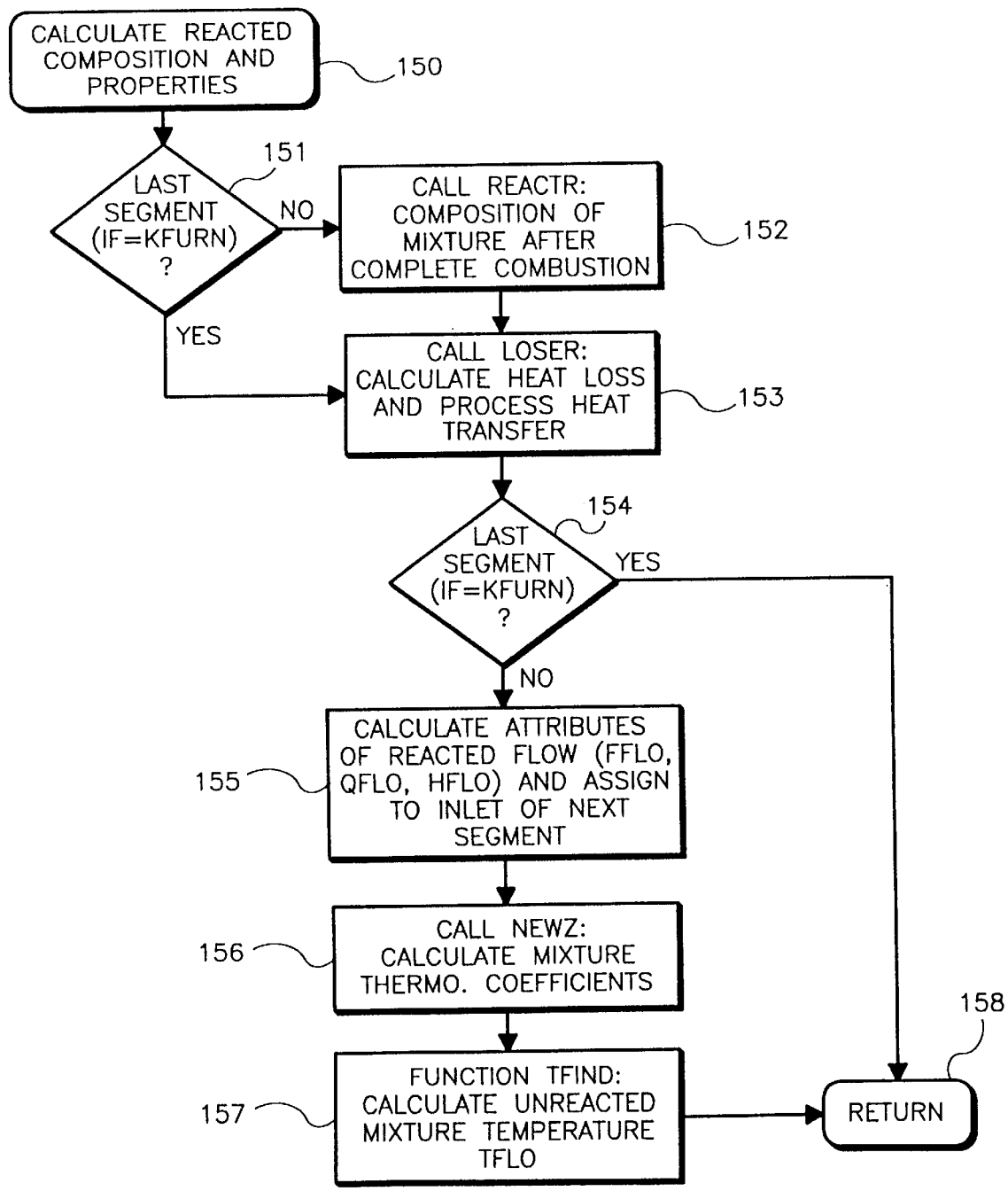
FIG. 15 is a flow chart for calculating a reacted composition and properties of the reacted composition for a segment of the furnace.

A detailed flow chart for the step 107 of calculating the reacted composition and properties is shown in FIG. 15. At a step 151, a determination is made as to whether the segment is the last segment. If the segment is not the last segment, a REACTR routine is called at step 152 for performing a complete combustion calculation in which all of the carbon is converted in carbon dioxide, all of the hydrogen is converted into water, and leftover oxygen and nitrogen pass through as products. The REACTR routine assumes that more than enough oxygen is available for combustion. While reburning involves insufficient air for complete combustion, the reburning zone and overfire air addition is treated as a single zone with both streams entering simultaneously. The invention, however, could be implemented in a more detailed manner by examining fuel rich chemistry in the reburn zone.

At step 153, a routine LOSER is called to determine the heat losses and process heat transfer. The calculations for heat loss and heat transfer are specified for each type of segment. The routine LOSER determines the type of segment before determining the amount of heat loss or amount of heat transfer. For some segments, the heat loss is simply proportional to the amount of heat transfer which has already been calculated for the regenerator segment. For instance, the crown heat loss and regenerator heat loss are treated as a certain percentage of the regenerator heat transfer rate. The melter heat loss can be determined from the input flow conditions (temperature, composition, and flow rate), the heat transfer to the glass, and the exit flow conditions. The useful heat absorbed by the melt can be determined from the temperature of the glass batch entering the segment, the temperature of the melt, the thermal properties of the glass batch including mean heat capacity and heat of reaction, and the mass flow rate of the glass batch.

At step 154, a determination is made as to whether the segment is the last segment. If the segment is not the last segment, then at step 155 attributes of the reacted flow are calculated and are assigned to the inlet stream of the next segment. The attributes which are calculated include the mass flow rate, enthalpy flow rate, and enthalpy of the reacted flow. The routine NEWZ is called at step 156 to determine the thermodynamic coefficients of the reacted flow and then, at step 157, the routine TFIND is called to determine the temperature of the reacted flow. The process returns at step 158 to the routine in FIG. 10.

Figure 16:
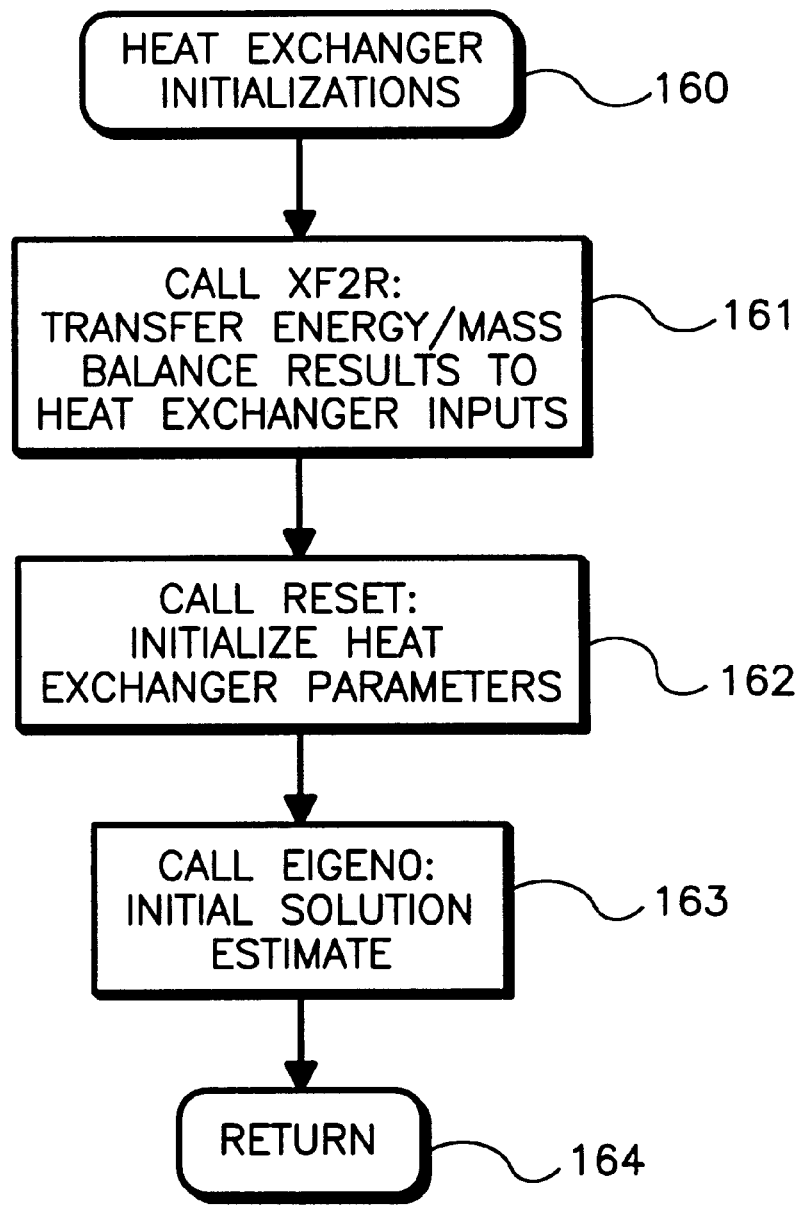
FIG. 16 is a flow chart for initializing a heat exchanger calculation.

A detailed flow chart for step 90 in FIG. 8 of performing heat exchanger initializations is shown in FIG. 16. The process depicted in FIG. 16 includes calculations needed only by the full regenerator model but is also performed for the simplified regenerator model and the recuperator model as it initializes parameters also used by those models. At step 161, a routine XF2R is called to convert the results from the mass and energy balance into inputs for the heat exchanger model. At step 162, the routine RESET is called to initialize other heat exchanger parameters. At step 163, the routine EIGEN0 is called again to estimate an initial solution based on the inlet information, when program and user input parameters so dictate. The processing then returns at step 164 to the routine in FIG. 8.

Figure 17:
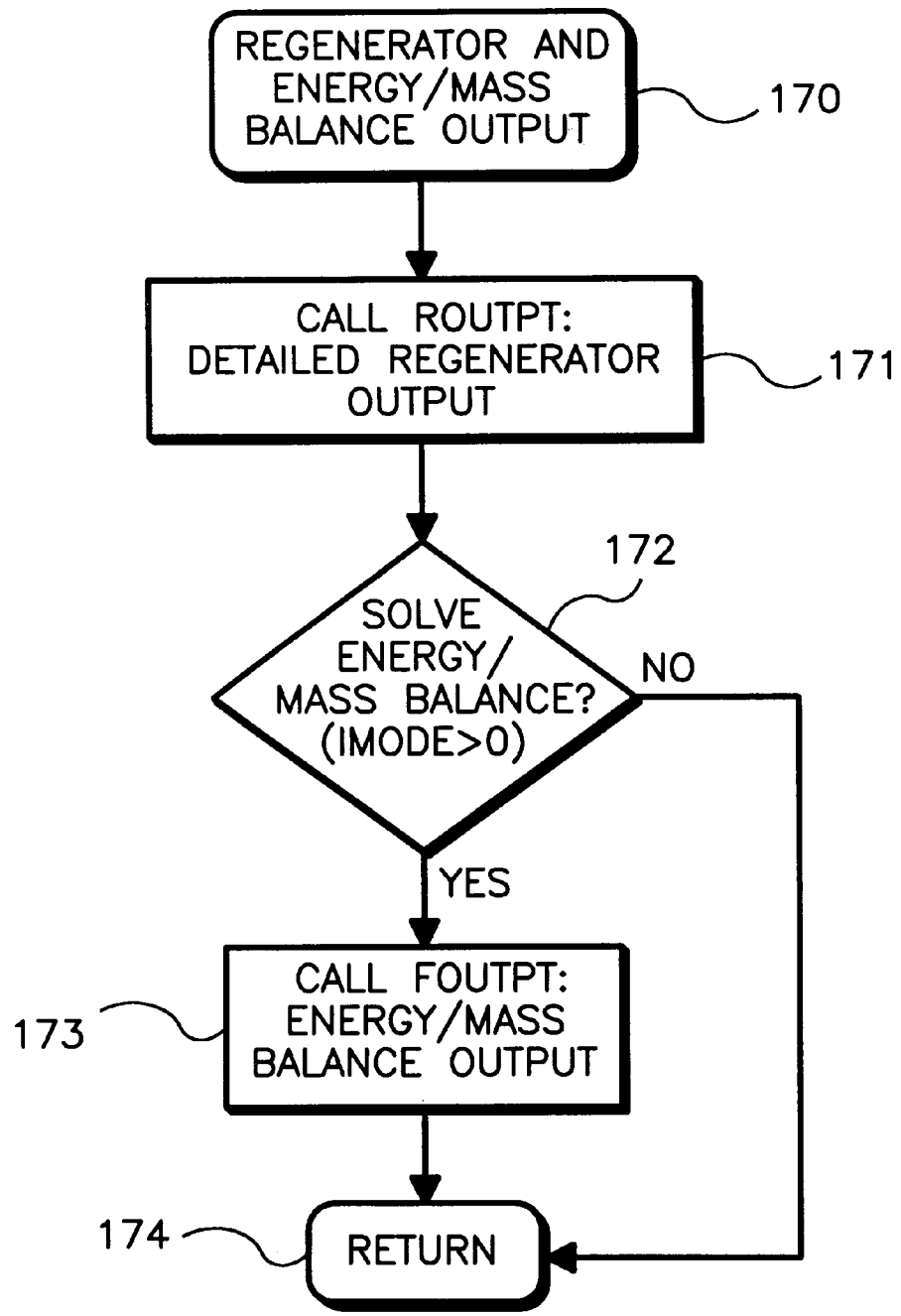
FIG. 17 is a flow chart for outputting results of a regenerator model and mass and energy balance.

A detailed flow chart for step 55 of outputting the regenerator results and energy and mass balance results is shown in FIG. 17. At step 171, a routine ROUTPT is called to report the temperature profiles in the regenerator as a function of time and location in the regenerator, as well as other results of the regenerator model. The routine ROUTPT preferably has parameters for specifying the format of the reports so that the file can be easily imported into other software packages, such as a spreadsheet program. The routine ROUTPT also reports parameters used by the regenerator model and provides a summary of the energy balance and temperatures for the regenerator.

The routine FOUTPT is called at step 173 if the mass and energy balance was solved, as determined at step 172. The routine FOUTPT prints a summary of the mass and energy balance, which includes a table that lists for all flows in each segment the mass flow rate, temperature, enthalpy, enthalpy flow rate, and composition.

The simplified regenerator model, which is called in step 85 of FIG. 8, is useful in instances when the regenerator model and mass and energy balance do not quickly converge. When both the full regenerator model and the mass and energy balance are being determined, a large percentage of the computational time is consumed within the full regenerator model. The time consumed within the full regenerator model is significantly increased when the mass flows are being adjusted, such as with the reburning model. The simplified regenerator model can be used to quickly estimate the regenerator model quantities which are used as inputs to the mass and energy balance and thus shorten the total execution time.

With either the simplified regenerator model or the full regenerator model, the chief parameter which is supplied to the mass and energy balance is the mean regenerator heat transfer $Q_{REG}$, which is the average rate at which heat is given up by flue gas on one side of the regenerator and absorbed by the air on the other side. The mean regenerator heat transfer $Q_{REG}$ also determines the amount of heat loss in the regenerator and heat loss in the regenerator crown since these losses are specified as being proportional to the mean regenerator heat transfer $Q_{REG}$. The mean regenerator heat transfer $Q_{REG}$ is therefore significant since it determines several components of the overall mass and energy balance.

The full regenerator model calculates the mean regenerator heat balance $Q_{REG}$ separately on each side with $Q_{REGT}$ representing the change in total enthalpy flow rate of the flue gas and $Q_{REGB}$ representing the change in total enthalpy flow rate of the regenerator air. In the converged solution of the detailed regenerator model, these two quantities $Q_{REGT}$ and $Q_{REGB}$ should be equal in magnitude and opposite in sign. With most cases, the air-side regenerator is the first heat transfer section and the composition entering this section is typically known and constant. Based on energy balance, the air-side regenerator exit temperature is then a function of the regenerator heat transfer and the air-side mass flow. This relationship may be written as follows:

$$Q_{REG}=F_{reg,air} \cdot (h_{air,o}-h_{air,i}) \quad \text{(EQ. 9)},$$

where h represents enthalpy per unit mass and $F_{reg,air}$ is the regenerator air mass flow rate. The full regenerator model accounts for regenerator heat losses indirectly by adjusting the regenerator mass flow rate. The regenerator air mass flow rate $F_{reg,air}$ is slightly higher than the actual mass flow calculated from the mass and energy balance with the additional mass being discarded at the regenerator exit and carrying with it the energy representing the heat loss.

For a given composition, h is a known function of temperature. If the air inlet temperature and mass flow rates are known from inputs or from other models, such as the reburn model, then the only unknown parameter on which $Q_{REG}$ depends is the air-side outlet temperature, referred to here as $T_{air,o}$. Thus, the prediction of the regenerator air-side outlet temperature $T_{air,i}$, also determines the net regenerator heat transfer $Q_{REG}$, which is the quantity needed by the overall mass and energy balance.

The simplified regenerator model is designed to be used only with reburning since reburning in a regenerator is typically the most time consuming case. The simplified regenerator model is based on assumptions that the air mass flow rate $F_{reg,air}$ and the gas temperature leaving the furnace melter $T_{f,exit}$ are the two factors having the greatest effect on regenerator heat transfer. The mass flow rate $F_{reg,air}$ impacts the air preheat temperature for a given regenerator heat transfer rate. The gas temperature leaving the melter $T_{f,exit}$ is significant since it affects the temperature of gas entering the flue gas side of the regenerator, thus the regenerator heat transfer $Q_{REG}$, and the air preheat temperature.

Based on the above considerations, the simplified regenerator model provides a simple relationship which describes the dependence of air-side regenerator exit temperature $T_{air,o}$ on the air flow rate through the regenerator $F_{reg,air}$ and on flue gas temperature leaving the melter $T_{f,exit}$. As discussed above, once the value of the air-side regenerator exit temperature $T_{air,o}$ is known, the regenerator heat transfer $Q_{REG}$ can be determined.

The mass and energy balance and the full regenerator model have been run for a number of cases in which the regenerator air-side flow rate $F_{reg,air}$ and the regenerator exit temperature $T_{f,exit}$ are varied over a wide range, starting from a representative operating condition and holding other operational parameters constant, including the stoichiometry. The temperature of the air exiting the regenerator $T_{air,o}$ was found to be nearly linearly dependent on both regenerator air-side flow rate $F_{reg,air}$ and the melter exit temperature $T_{f,exit}$ or the range of conditions. The coefficients of the linear relationship vary with the specific type of furnace and thus should be determined on a case by case basis.

The simplified regenerator model employs the following linear relationship:

$$T_{air,o}=T_o+DT_F+DT_T \quad \text{(EQ. 10)},$$

where $T_o$ represents the air-side regenerator exit temperature at baseline conditions, $DT_F$ represents the change in air-side regenerator exit temperature $T_{air,o}$ due to a change in the air flow rate $F_{reg,air}$ from the baseline conditions, and $DT_T$ represents the change in air-side regenerator exit temperature $T_{air,o}$ due to a change in the melter exit temperature of the flue gas $T_{f,exit}$ from the baseline conditions.

The changes in temperatures $DT_F$ and $DT_T$ can be determined according to the following equations:

$$DT_F = \frac{(F_{reg,air} - F_0)(T_1 - T_0)}{(F_1 - F_0)} \text{ and} \quad \text{(EQ. 11)}$$

-continued $$DT_T = \frac{(T_{f,exit} - T_{f,exit0})(T_2 - T_0)}{(T_{f,exit2} - T_{f,exit0})}. \quad \text{(EQ. 12)}$$

The baseline conditions for a furnace, which are termed Perturbation 0, have a baseline regenerator air-side exit temperature $T_0$, a baseline regenerator air flow rate $F_0$, and a baseline melter exit temperature $T_{f,exit0}$.

In order to estimate the linear relationship between the air-side exit temperature $T_{air,o}$ and the regenerator air flow rate $F_{reg,air}$, another case, called Perturbation 1, is run through both the full regenerator model and the mass and energy balance. In Perturbation 1, the regenerator has the same conditions as Perturbation 0 except that the regenerator air flow rate $F_{reg,air}$ is changed to another value of $F_1$. The results of Perturbation 1 indicate that the change in flow rate to the value of $F_1$ causes the air-side exit temperature $T_{air,o}$ to change to a value of $T_1$.

In order to estimate the linear relationship between the air-side exit temperature $T_{air,o}$ and the temperature of the gas exiting the melter $T_{f,exit}$, another case, called Perturbation 2, is run through both the full regenerator model and the mass and energy balance. In Perturbation 2, the regenerator has the same conditions as the original baseline case except that the temperature of the gas exiting the melter $T_{f,exit}$ is changed to another value of $T_{f,exit2}$. The results of Perturbation 2 indicate that the change in the temperature of the gas leaving the melter $T_{f,exit}$ to a value of $T_{f,exit2}$ causes the air-side regenerator temperature $T_{air,o}$ to change to a value of $T_2$.

The magnitudes of the difference between the baseline regenerator air flow rate $F_{reg,air}$ and the value $F_1$ for Perturbation 1 and the difference between the temperature of the gas exiting the melter $T_{f,exit}$ for the baseline case and the changed value of $T_{f,exit2}$ for Perturbation 2 are not critical to the invention. The magnitudes of the differences are specified by default values but may be varied according to the desires of a user.

While Equations 10 to 12 assume that the temperature of the gas exiting the melter $T_{f,exit}$ remains at its baseline condition for Perturbation 1 and the regenerator air flow rate $F_{reg,air}$ remains at its baseline condition for Perturbation 2, the magnitudes of these parameters may actually change from their baseline conditions. For instance, with Perturbation 1, the temperature of the flue gas exiting the melter $T_{f,exit}$ may not be $T_{f,exit0}$ as assumed but may instead be another value $T_{f,exit1}$. If the air-side regenerator temperature $T_{air,o}$ is calculated to be at a temperature $T_1^*$ when the flue gas exit temperature $T_{f,exit}$ is equal to $T_{f,exit1}$ and the air flow rate $F_{reg,air}$ is equal to $F_1$, then a corrected value of $T_1$ which fits the assumptions of the model can be calculated according to the following equation:

$$T_1 = T_1^* - \left[(T_{f,exit1} - T_{f,exit0}) \times \frac{(T_2 - T_0)}{(T_{f,exit2} - T_{f,exit0})}\right]. \quad \text{(EQ. 13)}$$

The air side regenerator temperature $T_2$ for Perturbation 2 can be corrected from the actual value $T_2^*$ when the flue gas exit temperature $T_{f,exit}$ is equal to $T_{f,exit2}$ and the air flow rate $F_{reg,air}$ is equal to $F_2$, by the following equation:

$$T_2 = T_2^* - \frac{(F_2 - F_0)(T_1 - T_0)}{(F_1 - F_0)}. \quad \text{(EQ. 14)}$$

Since the correction for $T_1$ depends on $T_2$ and the correction of $T_2$ depends on $T_1$, Eqs. 13 and 14 are to be solved iteratively. While holding all other parameters fixed, $T_1$ and $T_2$ are calculated successively until their values come to a consistent solution.

Figure 18:
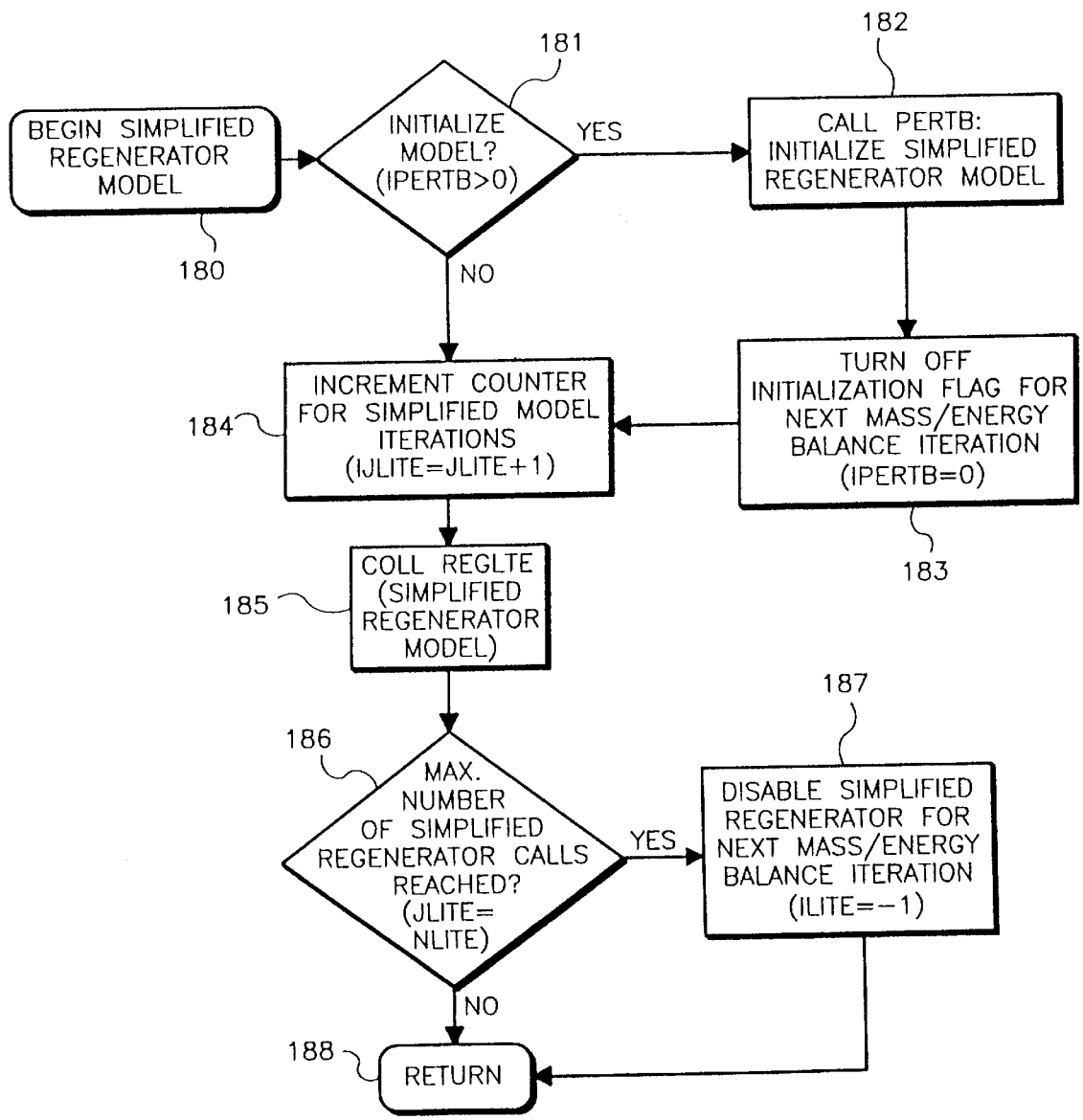
FIG. 18 is an overall flow chart for a simplified regenerator model.

With reference to FIG. 18, a flow chart for the overall simplified regenerator model begins at step 180 and then determines at step 181 whether the simplified regenerator model has been initialized. A routine PERTB is called at step 182 to initialized the simplified regenerator model if the model needs to be initialized. Next, at step 183, an initialization flag is turned off so that the simplified regenerator model will not be initialized during the next pass through the simplified regenerator model. A counter for tracking the number of iterations through the simplified regenerator model is incremented at step 184. A routine REGLTE is called at step 185 for performing the calculations for the simplified regenerator model. When the maximum number of simplified regenerator calls has been reached, as determined at step 186, the simplified regenerator is disabled at step 187. The processing returns at step 188 to the routine in FIG. 8.

Figure 19:
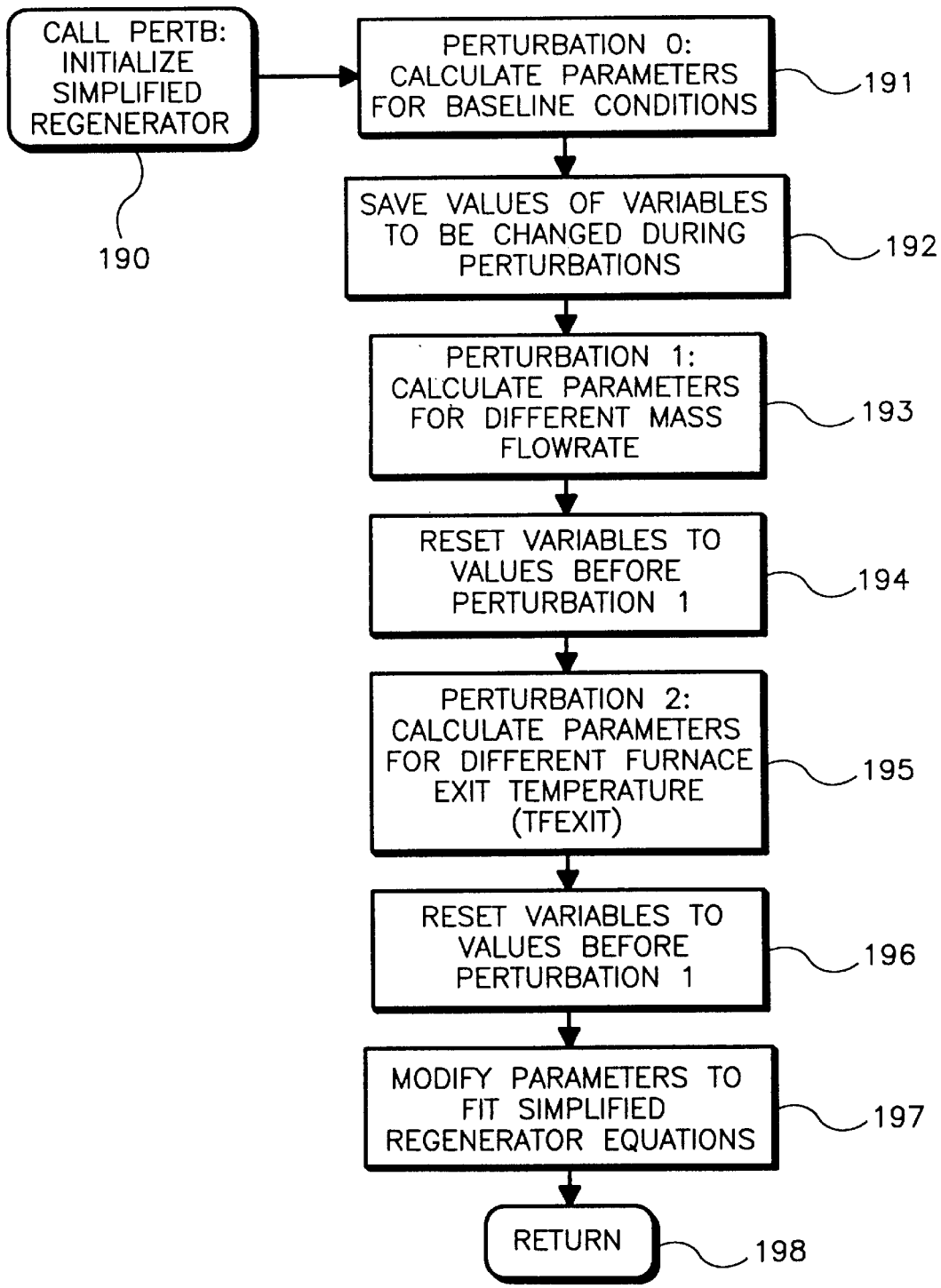
FIG. 19 is a flow chart for initializing a simplified regenerator model.

A flow chart of the routine PERTB for initializing the simplified regenerator model is shown in FIG. 19. At step 191, parameters of the furnace are calculated with the full regenerator model in order to provide a baseline condition, which is Perturbation 0. Next, at step 192, values of variables which change in subsequent perturbations are saved and, at step 193, the energy/mass balance and the full regenerator model is run at a different mass flow rate for Perturbation 1. The variables are reset to the values before Perturbation 1 at step 194 and then at step 195 Perturbation 2 is calculated with a changed furnace exit temperature. At step 196, the variables are once again reset to the values before Perturbation 1 and at step 197 the parameters are modified to fit the simplified regenerator model. The modification of the parameters, such as $T_1^*$ to $T_1$ with Equation 13 and $T_2^*$ to $T_2$ with Equation 14, provide a more accurate relationship between the air-side regenerator temperature $T_{air,o}$ and both the gas exit temperature $T_{f,exit}$ and the air flow rate $F_{reg,air}$. Processing in FIG. 19 returns at step 198 to the flow chart in FIG. 18.

Figure 20:
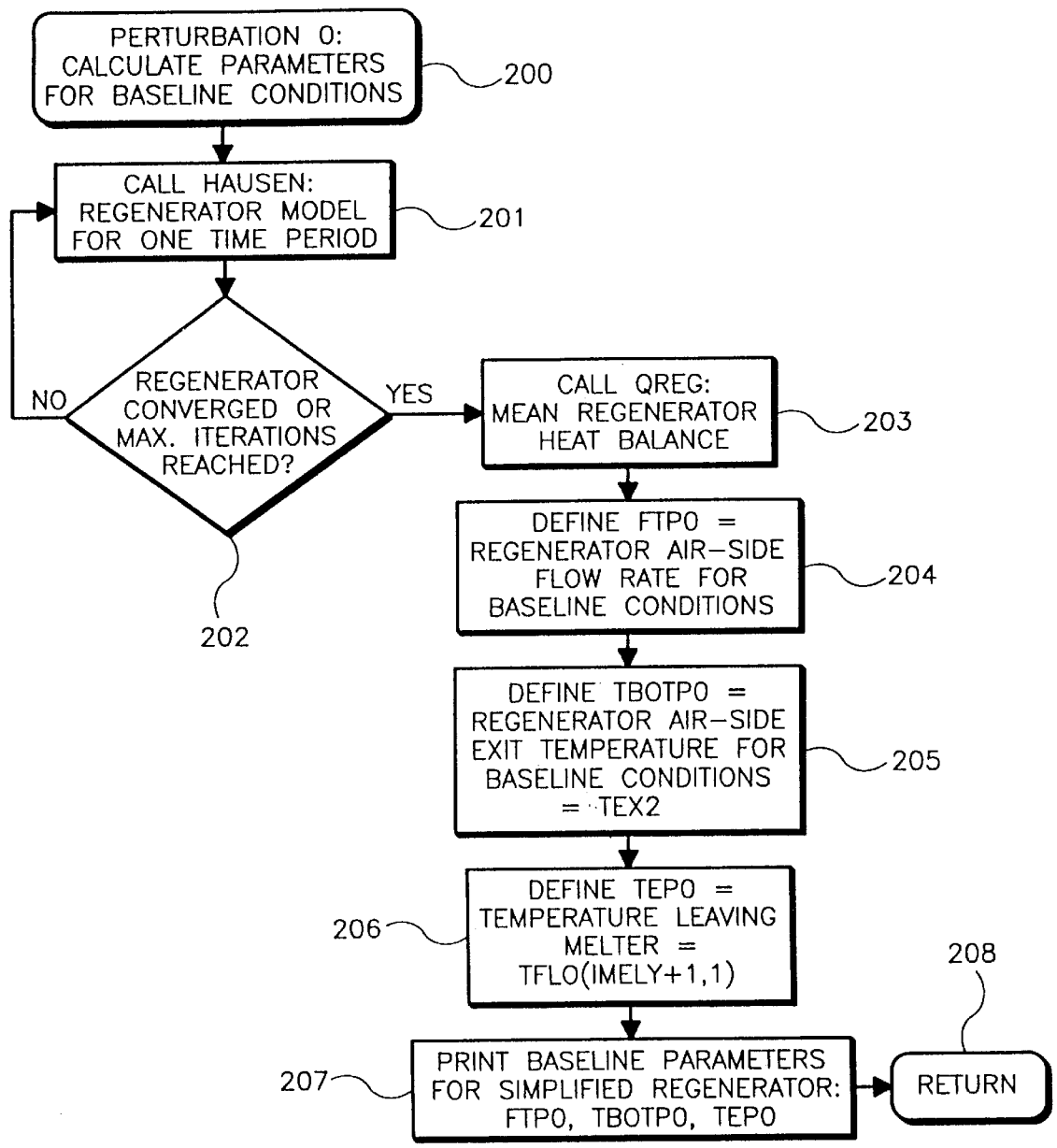
FIG. 20 is a flow chart for calculating baseline conditions for a simplified regenerator model.

With reference to FIG. 20, the calculations for the baseline case, which is Perturbation 0, calls the HAUSEN routine at step 201. Once the regenerator has converged or the maximum number of iterations has occurred, as determined at step 202, then the routine $Q_{REG}$ is called at step 203 to determine the mean regenerator heat balance. In the simplified regenerator model, the regenerator heat transfer is assumed to equal the change in total enthalpy flow rate of the flue gas $Q_{REGT}$ and to be equal and opposite to the change in total enthalpy flow rate of the regenerator air $Q_{REGB}$ The baseline parameters for the air-side regenerator mass flow rate, the regenerator air-side exit temperature, and the temperature of the gas leaving the melter are next set at steps 204 to 206, respectively. The baseline parameters are printed at step 207 and processing returns at step 208 to the routine depicted in FIG. 19. Similar logic is used to evaluate Perturbations 1 and 2, after changing the input operating conditions appropriately, and reinitializing the energy/mass balance.

Figure 21:
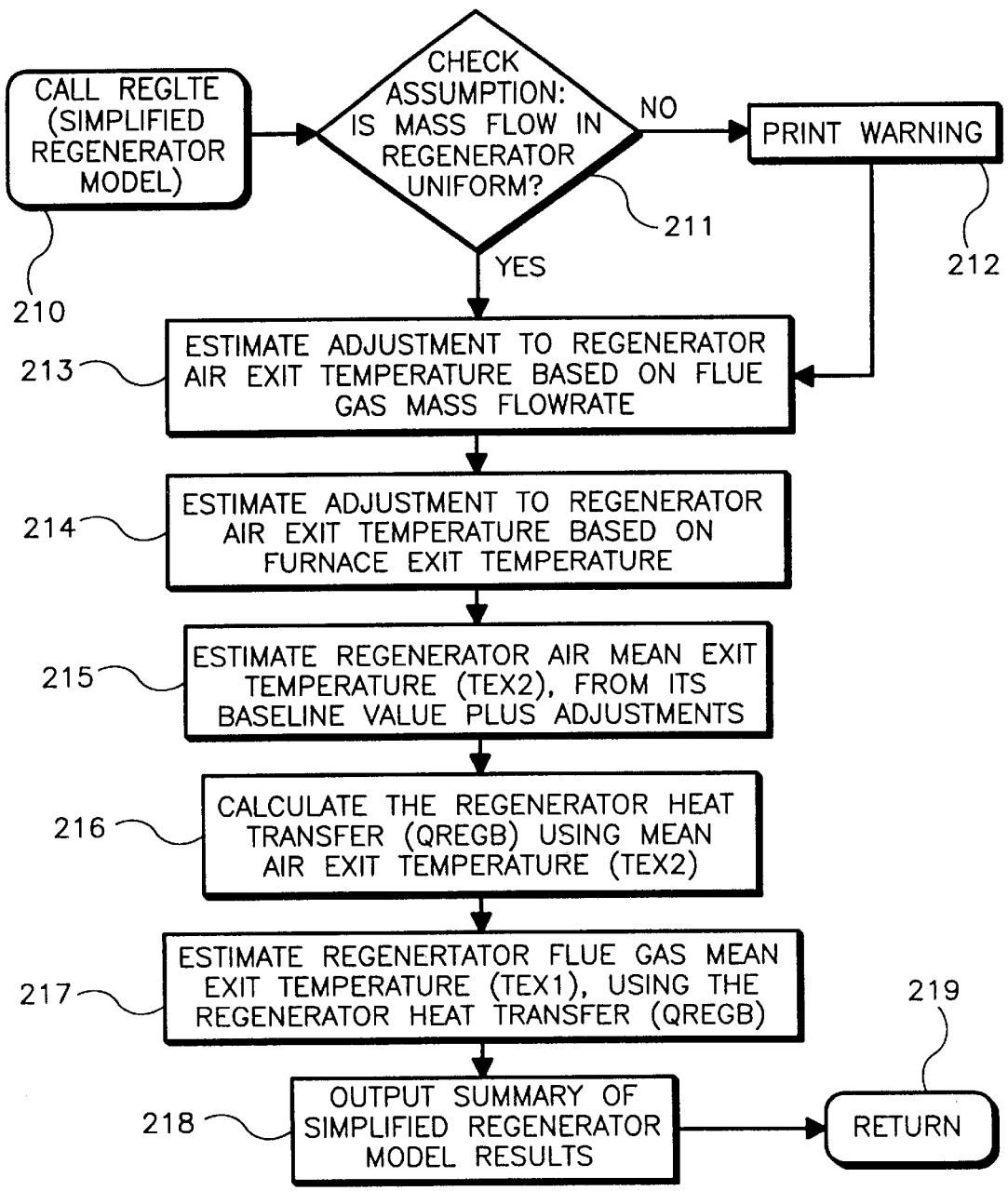
FIG. 21 is a detailed flow chart for calculating non-baseline conditions for a simplified regenerator model.

A detailed flow chart for the routine REGLTE is shown in FIG. 21. A check is first made at step 211 to determine whether the mass flow in the regenerator is uniform. If the flow is not uniform, then a warning is printed at step 212 indicating that the simplified regenerator model should be run with only uniform mass flows. An adjustment to the regenerator air exit temperature $T_{air,o}$ is calculated at step 213 based on a change in the flue gas mass flow rate $F_{reg,air}$ from baseline conditions. This adjustment corresponds to the value of $DT_F$ in Equation 11. An adjustment to the regenerator air exit temperature $T_{air,o}$ is calculated at step 214 based on the change in furnace exit temperature $T_{f,exit}$. The adjustment in step 214 corresponds to the value of $DT_T$ in Equation 12, which was set forth previously.

Based on the adjustments determined in steps 213 and 214, the mean regenerator air exit temperature is determined at step 215 in accordance with Equation 10. The mean regenerator heat transfer $Q_{REG}$ is calculated at step 216 from the mean air exit temperature $T_{air,o}$ and the flue gas mean exit temperature is determined at step 217 based on the mean regenerator heat transfer $Q_{REG}$. The results of the simplified regenerator model are output at step 218 and processing returns at step 219 to the routine depicted in FIG. 18.

The simplified regenerator model can advantageously be used to shorten the amount of time needed to predict the behavior of a regenerator model and to perform an energy and mass balance. The simplified regenerator model quickly provides fairly accurate estimates for the mass and energy balance. When the mass and energy balance converges using the simplified regenerator model, the mass and energy balance routine resumes use of the full regenerator model. The mass and energy balance is then performed with the full regenerator model until the results of the full regenerator model and the mass and energy balance converge.

When the regenerator model switches from a "coarse" to "fine" tolerance, it will run the simplified model again. That is, the full sequence is: run perturbations 0, 1, and 2 at coarse tolerance, iterate the simplified model, then iterate the full model to coarse convergence, then switch to fine tolerance, run perturbations 0, 1, and 2 at fine tolerance, iterate the simplified model, then iterate the full model to fine convergence. Thus, the simplified model is used twice per case.

While the simplified regenerator model has been described as providing intermediate results, the simplified regenerator model can have other uses. For instances, in some cases it may be desirable to have the mass and energy balance end processing when the results converge between the mass and energy balance and the simplified regenerator model. In these cases, the simplified regenerator model can be used with the mass and energy balance to provide even quicker estimations on the behavior of a furnace.

Further, the simplified regenerator model is not limited to the linear relationships described above. The simplified regenerator model could base the change in air side temperature $T_{air,o}$ on other parameters and can base the changes on cases other than reburning. Also, the relationship of the air side temperature $T_{air,o}$ to the relevant parameters may be based on non-linear relationships.

Figure 22:
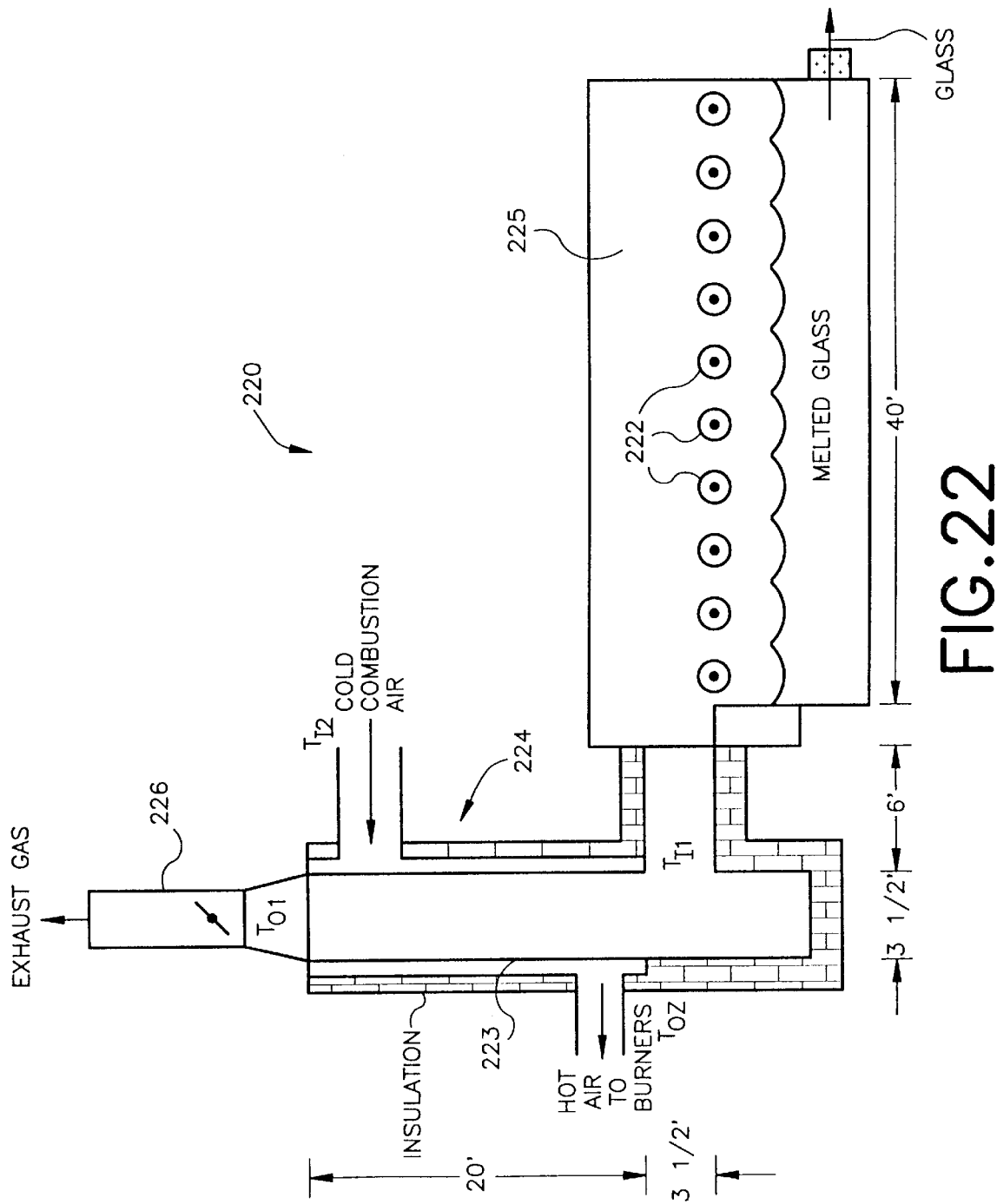
FIG. 22 is a schematic view of a fiber glass furnace having a recuperator.

In addition to modeling a regenerator, the invention can also model the behavior of a recuperator. An example of a glass furnace 220 having a recuperator 224 is shown in FIG. 22. The furnace 220 is an example of a fiber glass furnace and is shown as having ten burners 222 distributed along the length of a melter 225. The recuperator 224 is a twin shell heat exchanger 223 fitted around an exhaust stack 226. The hot exhaust gases are typically at a temperature of about 2400° F. in the area between the melter 225 and the recuperator 224 and exit the stack 226 at a temperature of about 1500° F. The twin shell recuperator 224 provides useful heat transfer from the exhaust gases to the cold combustion air whereby the air is preheated to a temperature of about 1050° F.

Figure 23:
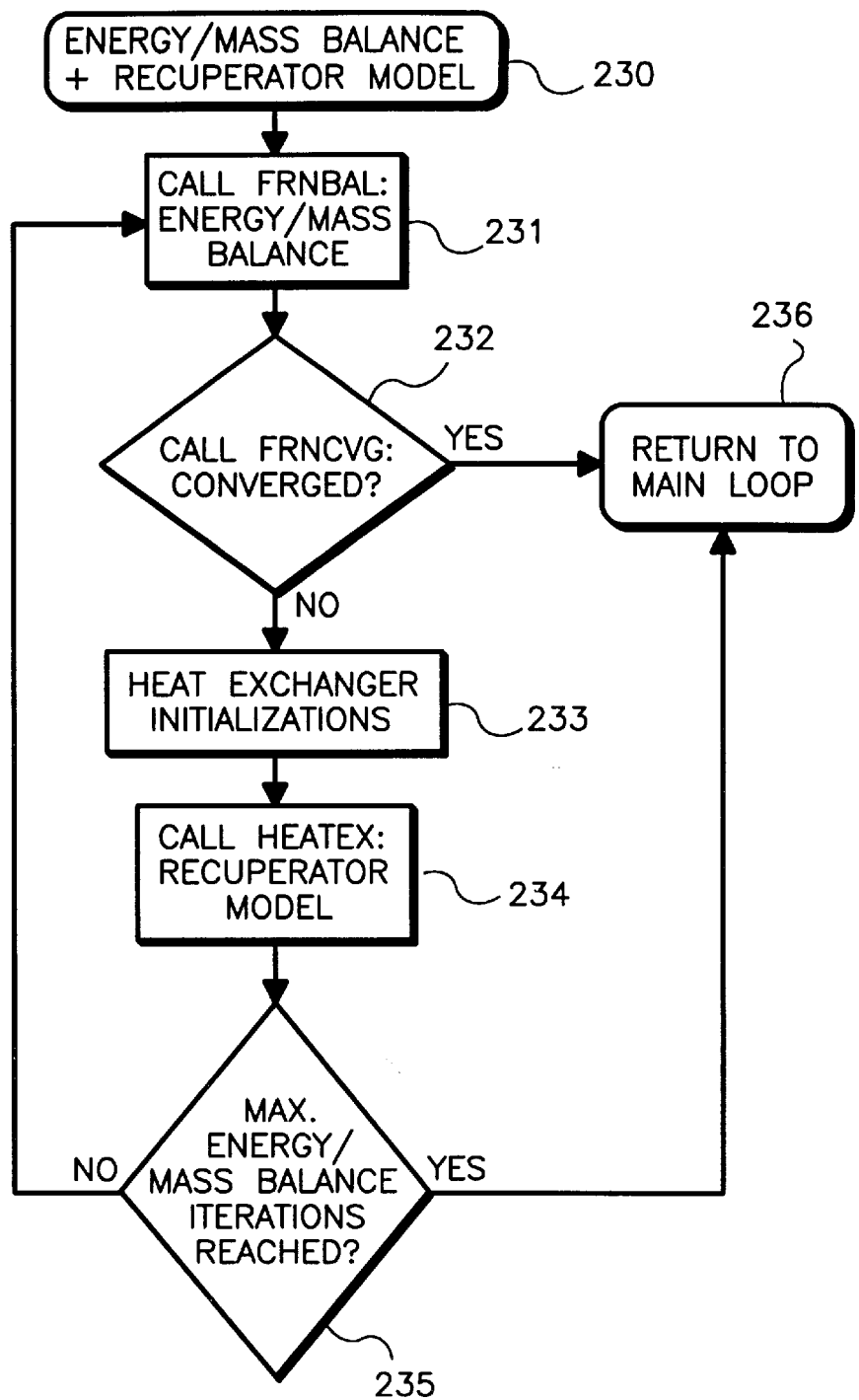
FIG. 23 is a flow chart for performing a mass and energy balance for a recuperator furnace.

As described above with reference to FIG. 5, the mass and energy balance is performed for a recuperator at step 56 with a detailed flow chart for this step 56 being shown in FIG. 23. After the routine FRNBAL is called at step 231 to solve the mass and energy balance, the routine FRNCVG is called at step 232 to determine whether the results have converged. When the results have not converged, then the heat exchanger parameters are initialized at step 233 and a routine HEATEX is called at step 234 in order to model the recuperator.

The routine HEATEX models the behavior of the recuperator using the overall heat transfer coefficient for the recuperative heat exchanger. As is known in the art, the total heat transfer in the recuperator may be calculated as the product of the overall heat transfer coefficient with total surface area and a log mean temperature difference. The log mean temperature difference DTLM is calculated by first determining the difference in temperatures at either end of the heat exchanger. For a counterflow heat exchanger, these differences are expressed by the following equations:

$$\Delta T_A = T_{I1} - T_{O2} \qquad \text{(EQ. 15)}$$

$$\Delta T_B = T_{O1} - T_{I2} \qquad \text{(EQ. 16)}$$

where $T_{I1}$ and $T_{O1}$ are the inlet and outlet temperatures for the exhaust gases and $T_{I2}$ and $T_{O2}$ are the inlet and outlet temperatures for the combustion air. The log mean temperature difference DTLM can be determined according to the following equation:

$$DTLM = \frac{\Delta T_A - \Delta T_B}{\ln\left(\frac{\Delta T_A}{\Delta T_B}\right)}. \qquad \text{(EQ. 17)}$$

Based on a given set of inlet conditions, the outlet conditions are determined, which are dependent upon the amount of heat transfer in the recuperator. The outlet conditions are initially estimated in order to find the heat transfer in the recuperator. Once the change in enthalpy is calculated, the routine TFIND can find the outlet temperatures. Since the recuperator heat transfer is dependent on the outlet temperatures through DTLM, HEATEX iterates between calculation of $Q_{REG}$ using DTLM, and the revision of the outlet temperatures based on the heat exchange QREG, until the outlet temperatures converge for a given set of flow and inlet temperature conditions.

The mass and energy balance for a furnace having a recuperator should be apparent from the description of the mass and energy balance for a furnace having a regenerator. In summary, the furnace is divided into a number of segments and a mass and energy balance is performed for each segment with the recuperator being one of the segments. The recuperator heat transfer is then calculated as described above and used in the next pass through the routine FRNBAL, to eventually arrive through iteration at converged results.

The recuperator model includes an allowance for heat loss similar to that for the regenerator model. However, the current implementation assumes that in the recuperator, the flue gas side is completely surrounded by the air side, as shown in FIG. 22, and therefore calculates a heat loss for the air side and not the flue gas side. This approach may easily be changed to adapt the model for a different recuperator geometry.

At step 235, a determination is made as to whether the maximum number of iterations have been performed for the mass and energy balance. If the maximum number of iterations has not occurred, then the routine FRNBAL is called again to determine the mass and energy balance. Once the results converge as determined at step 232, or the maximum number of iterations have occurred as determined at step 235, the processing returns at step 236 to the main routine in FIG. 5.

The invention can be implemented with any suitable hardware. For example, the invention can be implemented in Fortran 77 and then compiled and run on an Intel 486DX2 microprocessor operating at 66 MHz. While any suitable Fortran compiler can be used, the preferred Fortran compiler under DOS is the Lahey F77L EM/32 version 5.1 compiler since it has a DOS extender to allow an executable program size larger than 640 kilobytes. It should be understood that this manner of implementing the invention is only an example and that the invention can be implemented in numerous other ways, such as with other microprocessors, with other compilers, or even in other programming languages.

Figure 24:
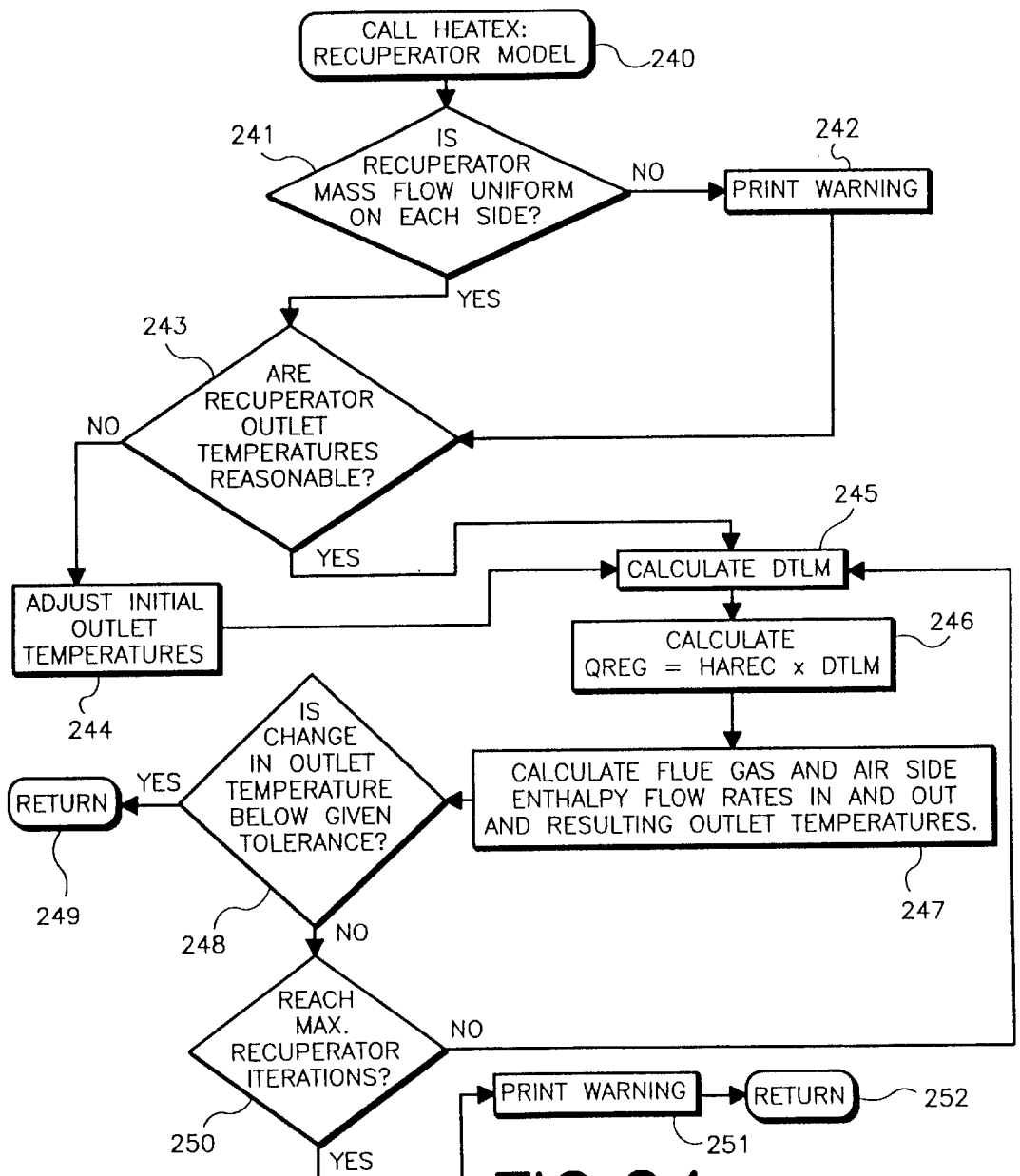
FIG. 24 is a flow chart for a routine HEATEX used to model recuperator furnaces.

With reference to FIG. 24, a flow chart for the routine HEATEX checks at step 241 as to whether the recuperator mass flow is uniform on each side. If the mass flow is not uniform, a warning is printed at step 242. At initial step 243, a determination is next made as to whether the estimates of the recuperator outlet temperatures are reasonable. If the temperatures are not reasonable, then at step 244 the initial outlet temperatures are adjusted. At step 245, the log mean temperature difference DTLM is calculated. If the difference between $\Delta T_A$ and $\Delta T_B$ is less than some small tolerance, the log mean temperature difference DTLM is preferably calculated according to an average of $\Delta T_A$ and $\Delta T_B$ in order to avoid any arithmetic errors.

The recuperator model, as shown in FIG. 24, has an iterative loop. At step 246, the mean heat transfer $Q_{REG}$ is calculated based on the log mean temperature difference DTLM and a user input variable HAREC, shown above in Table B. At step 247, the flue gas and air side enthalpy flow rates in and out are calculated based on the given inlet temperatures and $Q_{REG}$ and the resulting outlet temperatures are calculated based on the recuperator energy balance. If the change in outlet temperatures is below a given tolerance; as determined at step 248, then the processing returns at step 249 to the routine shown in FIG. 23. If the outlet temperatures are above the given tolerance, then at step 250 a check is made as to whether a maximum number of iterations has occurred. If the outlet temperatures have not converged but the maximum number of iterations has not been reached, processing returns to step 245 for another iteration. A warning is printed at step 251 and processing returns at step 252 if the outlet temperatures do not come below the tolerance within the maximum number of iterations.

Figure 25:
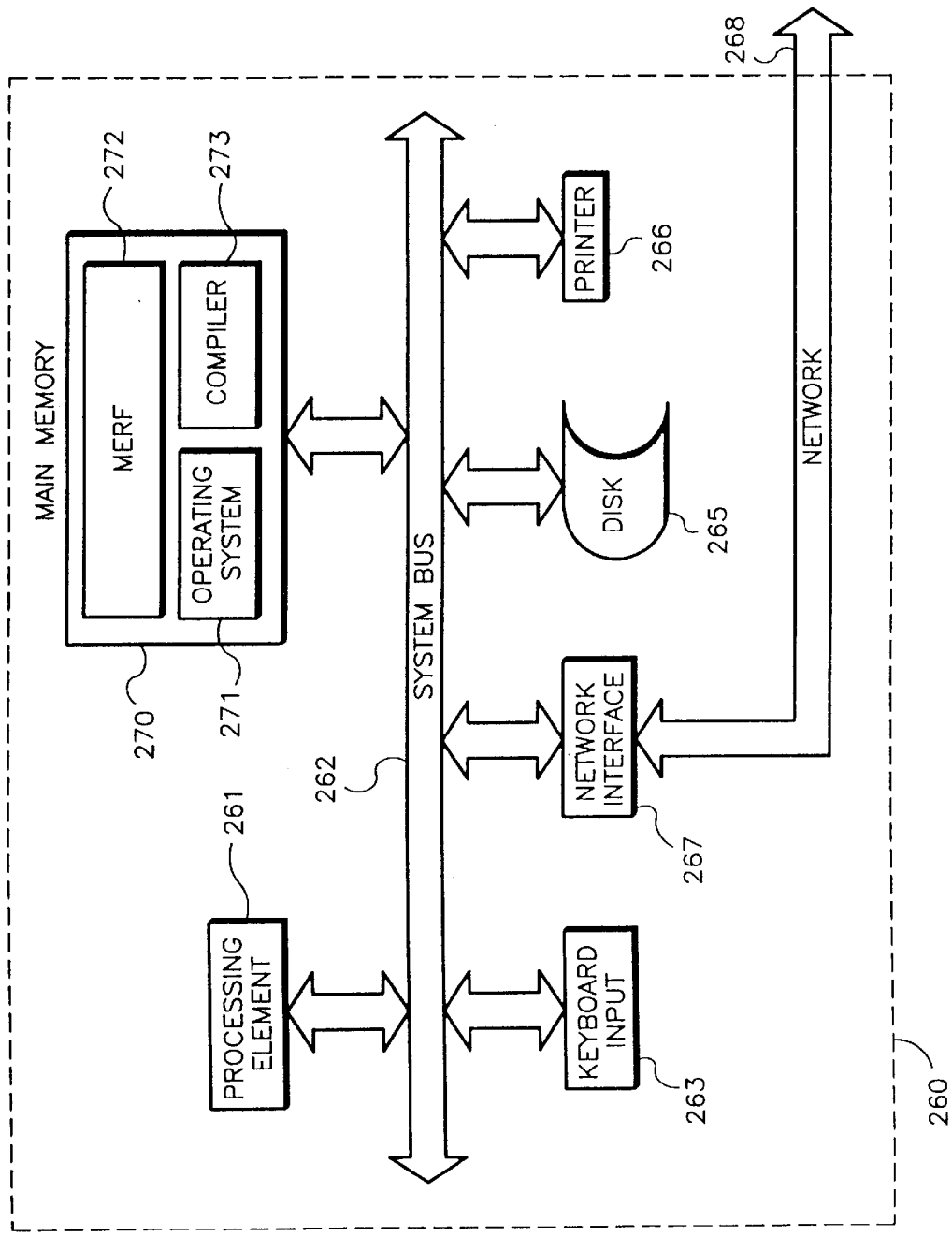
FIG. 25 is a block diagram of a computer system including the system according to the invention.

An example of a computer system 260 according to the invention is shown in FIG. 25. The computer system 260 comprises a processing element 261, such as the Intel 486DX2 microprocessor, connected to a system bus 262. An input device 263, such as a keyboard, is connected to the system bus 262 along with disk 265, and a printer 266. A main memory 270, which is also connected to the system bus 262, has an operating system 271 and a MERF program 272 according to the invention. The memory 270 may also include a compiler 273, such as the Lahey F77L EM/32 version 5.1 compiler. While not necessary, the computer system 260 may have a network interface 267 for connecting the system 260 to a network 268.

Further, the invention can be embodied in any computer-readable medium for use by or in connection with a computer-related system or method. In the context of this document, a computer-readable medium is an electronic, magnetic, optical, semiconductor, or other physical device or means that can contain or store a computer program for use by or in connection with a computer-related system or method. Also, the computer program may be transferred to another computer-readable medium by any suitable process, such as by scanning the computer-readable medium. Thus, the computer-readable medium could be paper or other suitable medium upon which the computer program may be printed, scanned with an optical scanner, and transferred into the computer's memory or storage.

The invention advantageously permits parametric studies to be performed on a furnace. For instance, the behavior of a furnace can be determined for various values of a parameter, such as regenerator length or composition of brick, in order to determine the effect of the given parameter on the furnace's overall operating characteristics. This is significant because a baseline condition for a furnace can be calculated and then variations due to a changed parameter or even due to reburning can be evaluated.

Figure 26A:
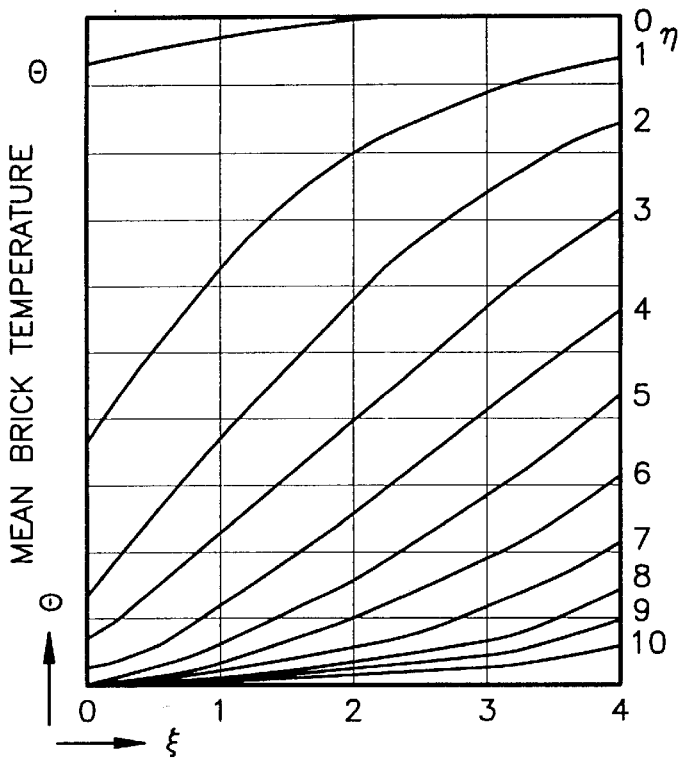
FIGS. 26(A) and (B) are plots, generated with the invention, of non-dimensional brick temperature and gas temperature, respectively, versus a per unit value of distance through packing for various per unit values of time.
Figure 26B:
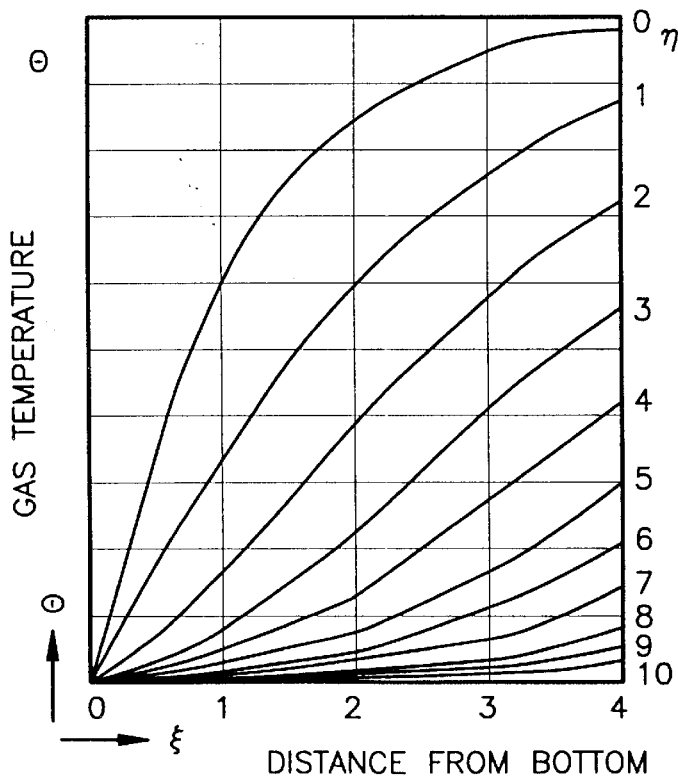

The invention accurately predicts the behavior of a regenerator, as described in the textbook by Hausen. In order to test the validity of the results from the invention, a case equivalent to one of the Hausen textbook examples has been calculated using a version of MERF in regenerator-only mode, with constant gas properties. The length of the regenerator is converted into a non-dimensional value of $\Lambda$, which is equal to $\bar{\alpha} F/C$, and the time period is converted into a non-dimensional value of $\Pi$, which is equal to $\bar{\alpha} FT/C_s$. The parameters used to define $\Lambda$ and $\Pi$ are as defined for Eqs. 1 to 6, with F as the total brick surface area and T as the total cycle time for flow in one direction. FIG. 26(A) shows a plot of the mean brick temperature $\theta$ versus $\xi$ where $\xi$ varies from zero to $\Pi$, consistent with Eq. 5, for various values of $\eta$ where $\eta$ varies from zero to $\Lambda$, consistent with Eq. 6. FIG. 26(B) shows a plot of the gas temperature $\theta$ versus packing depth $\xi$ for various values of time $\eta$. Both of these plots illustrate characteristics of a very short regenerator in a state of equilibrium, that is, the converged solution, where the values of $\Lambda$ and $\Pi$ are respectively 4 and 10. The plots show the development of temperature profiles during the cold flow air side portion of the cycle.

For this regenerator, as shown in FIG. 26(A), the mean temperature of the bricks is initially fairly high at a time $\eta=0$ and increases slightly from bottom to top along the length of the regenerator. As the cooler air enters the regenerator, the temperature of the bricks is decreased at subsequent periods of normalized time $\eta$ until the bricks are almost completely cooled. The gas, on the other hand, initially enters the regenerator very cold at a time $\eta=0$ and is warmed as the gas travels along the length of the regenerator. Because the mean temperature of the bricks decreases with time $\eta$, the gas is heated less and less at subsequent periods of time $\eta$.

Figure 27A:
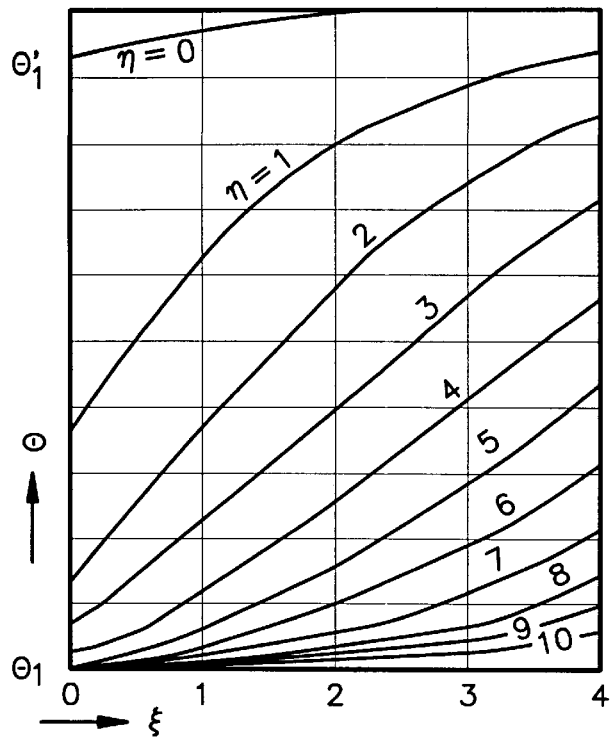
FIGS. 27(A) and (B) are plots, found in a standard text book, of brick temperature and gas temperature, respectively, versus a per unit value of distance for various per unit values of time.
Figure 27B:
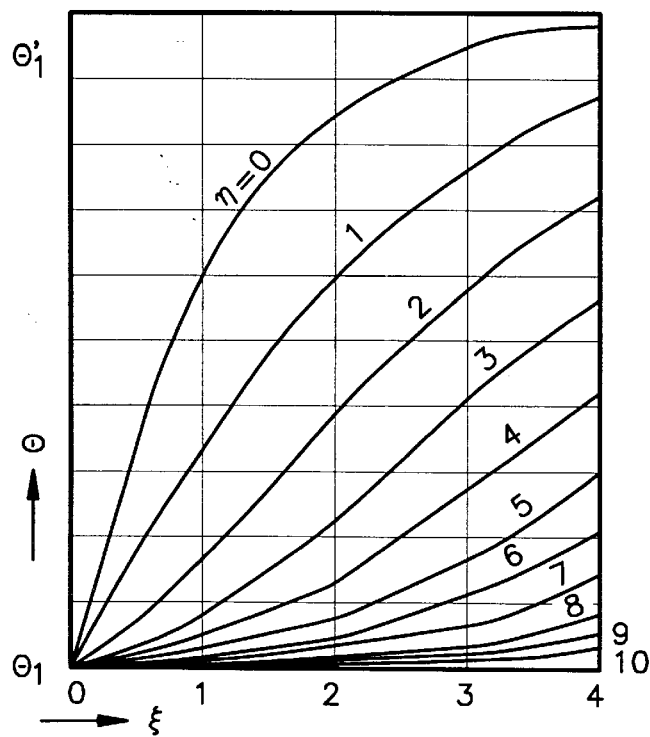

The plots generated with the invention were compared with plots produced by Hausen, which are shown in FIGS. 27(A) and 27(B). As should be apparent, the invention determined characteristics of a regenerator which are accurate in comparison to the results of Hausen. The invention can therefore be used to determine the characteristics of a furnace having a regenerator.

Figure 28:
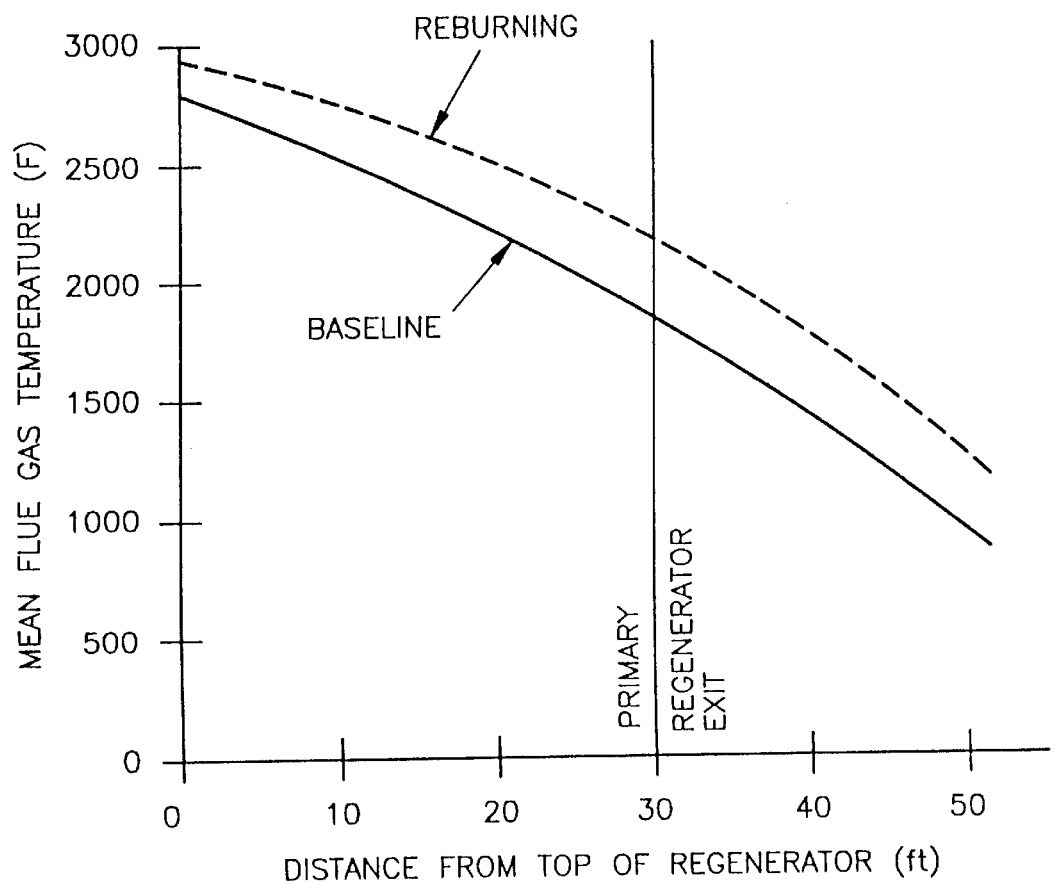
FIG. 28 is a plot of mean flue gas temperature versus distance along the regenerator for both baseline and reburning conditions.

The invention can also be used to accurately predict the effect that a reburning system will have on a furnace. For example, a mean flue gas temperature profile determined with the invention for a flat glass side port regenerator is shown in FIG. 28. The temperatures are average temperatures throughout the cycle and, as shown in the figure, the flue gas enters at a high temperature and is cooled as the heat is transferred to the brick along the length of the regenerator. The baseline temperatures are shown by a solid line whereas the increase in temperatures due to reburning are shown by a dashed line. The flat glass side port regenerator is comprised of two regenerator sections in series with the junction between the two sections being denoted in the figure as the "Primary Regenerator Exit."

Figure 29:
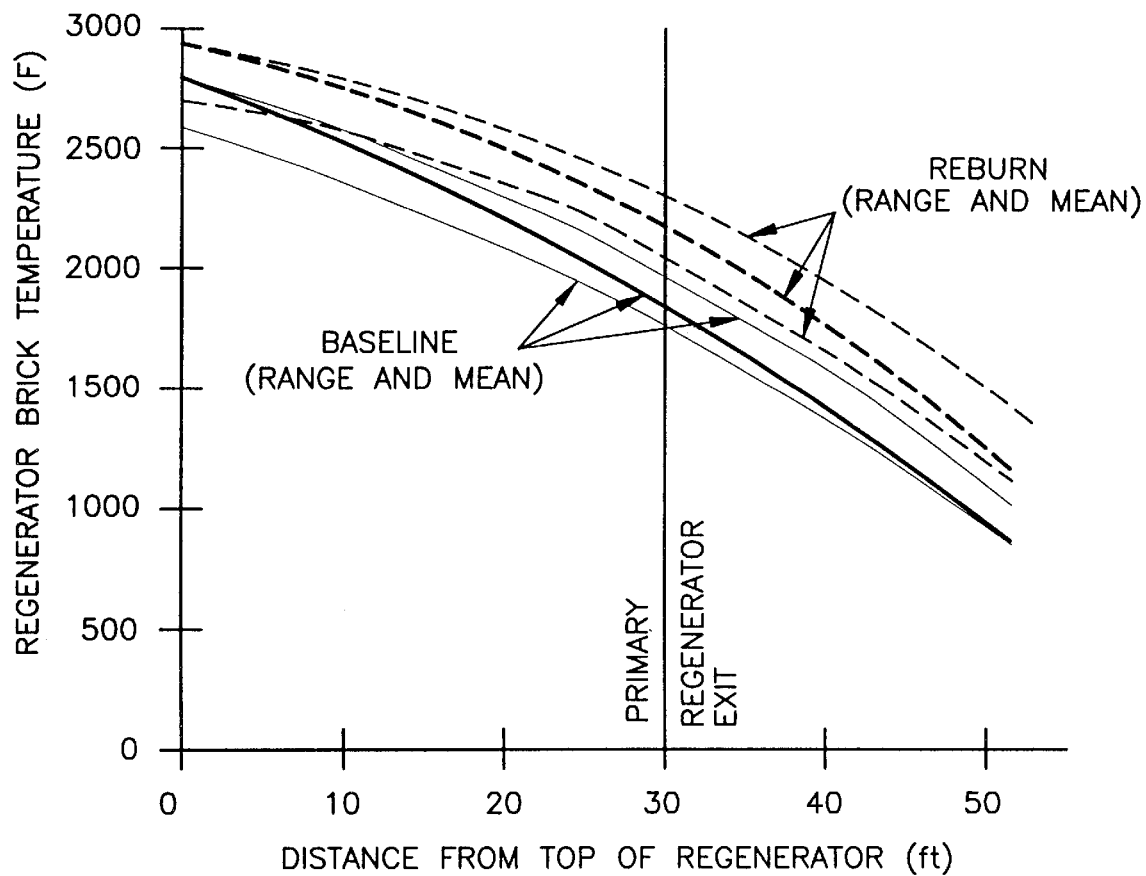
FIG. 29 is a plot of brick temperature versus distance along the regenerator for both baseline and reburning conditions.

A regenerator brick temperature profile predicted with the invention for the flat glass side port regenerator is shown in FIG. 29. As with FIG. 28, the temperature of the regenerator brick is at a high temperature at the entrance to the regenerator due to the high temperature of the flue gases. The temperature of the brick, however, decreases along the length of the regenerator. The range and mean temperatures of the regenerator brick for the baseline are shown by solid lines and the mean and range temperatures due to reburning are shown by dashed lines. In this application, two cases were run with different assumptions about the distribution of air leakage. These two cases represent the "range" of expected mean regenerator temperatures. The mean profile is a distance weighted average of those profiles. The regenerator model itself does not consider leakage. By placing leakage either before or after the regenerator and averaging the profiles in this way, the effect of leakage in the regenerator itself may be simulated. All profiles in FIGS. 28 and 29 are time averaged over the cycle.

The invention is also used to determine the mass and energy for each flow within a furnace. The flows may be in a furnace having a recuperator, a regenerator, or a reburning system. Reference may be made to Energy and Environmental Research Corporation, "Glass Tank $NO_x$ Emission Control with Gas Reburn," Topical Report GRI-94/0018.2, Gas Research Institute, Chicago, March 1994 for details on the effects of reburning on $NO_x$ reductions, which is hereby incorporated by reference. As set forth in this report, and as illustrated in FIG. 3, the primary zone stoichiometric ratio is typically 1.1, the reburn stoichiometric ratio is typically 0.9, and the burnout stoichiometric ratio is typically 1.15. For given values of these stoichiometric ratios, the flow rates for the primary air, primary fuel, reburn fuel, and overfire air can be varied as long as the proportion of the flows result in the fixed stoichiometric ratios.

Figure 30:
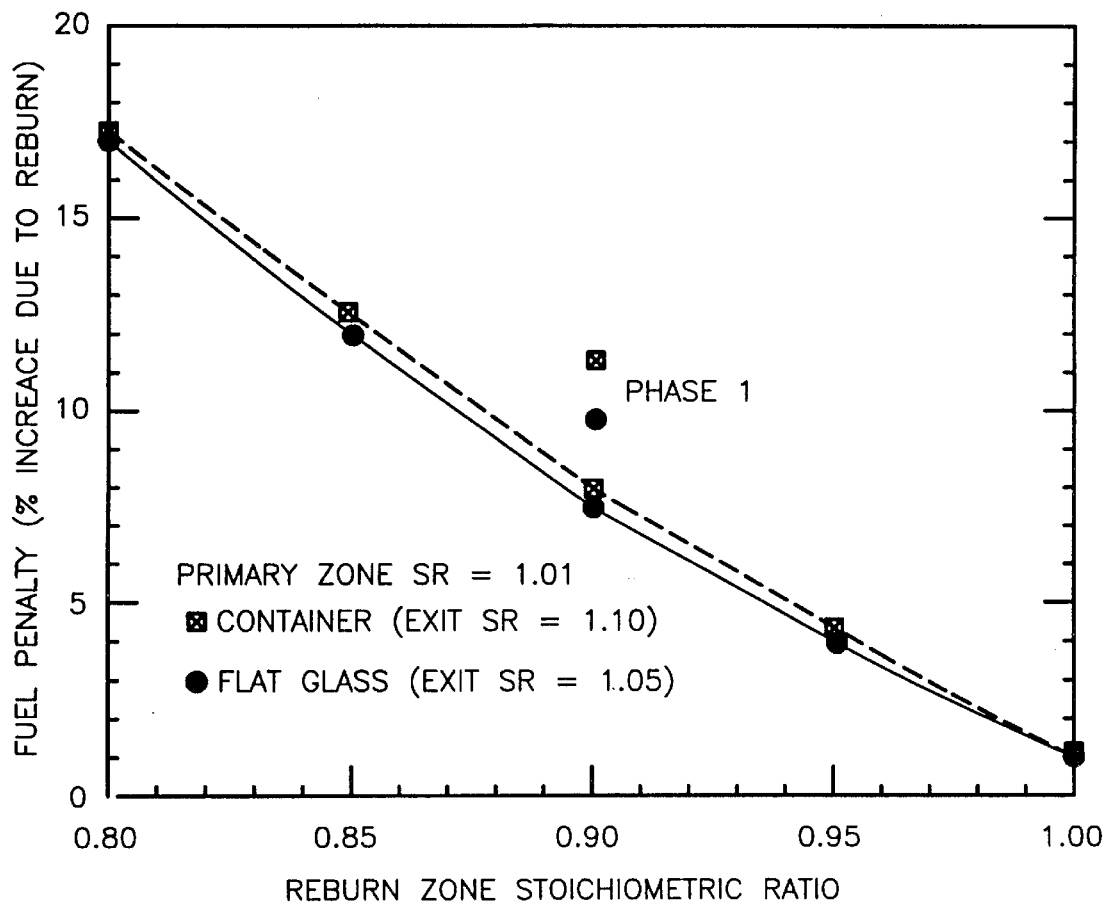
FIG. 30 is a plot of fuel penalty versus reburn zone stoichiometric ratio.

The invention can also be used to predict the impact of reburning on fuel consumption. While the reburn stoichiometry preferably remains constant, the reburn stoichiometry can have different values in cases which all have the same melter exit temperature. FIG. 30 illustrates the fuel penalty for a range of reburn zone stoichiometric ratios for both a container furnace and a flat glass furnace. The curves represent operation with the same melter exit temperature as for the baseline. The points which are not on the curve assume the same enthalpy flow rate into and out of the melter as for the baseline condition.

The foregoing description of the preferred embodiment of the invention has been presented for purposes of illustration and description. It is not intended to be exhaustive or to limit the invention to the precise form disclosed. Many modifications and variations are possible in light of the above teaching.

For example, the regenerator model may be used to model the behavior of the furnace when the furnace is initially started. Also, the invention can be applied to glass furnaces other than those described, such as a glass furnace having two reburning zones. Furthermore, while the invention has been described with reference to a glass furnace, the invention can be applied to other types of furnaces.

In concluding the detailed description, it should be noted that it will be obvious to those skilled in the art that many variations and modifications may be made to the preferred embodiment without substantially departing from the principles of the present invention. All such variations and modifications are intended to be included herein within the scope of the present invention, as set forth in the following claims. Further, in the claims hereafter, the corresponding structures, materials, acts, and equivalents of all means or step plus function elements are intended to include any structure, material, or acts for performing the functions in combination with other claimed elements as specifically claimed.

Wherefore, the following is claimed:

1. A method for determining a mass and energy balance for a furnace, comprising the steps of:

determining structural parameters of said furnace, initial operating conditions for said furnace, and segments which comprise said furnace; and proceeding through said segments of said furnace and successively calculating for each segment in said furnace a thermodynamic property of each mass flow entering the segment, said thermodynamic property of an unreacted mixture of said mass flows entering the segment, a composition of a reacted flow exiting the segment, and said thermodynamic property of said composition.

2. The method as set forth in claim 1, further comprising steps of:

determining a revised set of operating conditions for said furnace based on said proceeding and calculating step;

comparing said initial operating conditions with said revised set of operating conditions; and repeating said step of calculating, determining, and comparing until said operating conditions differ from a previous set of operating conditions by less than a predefined set of tolerances.

3. The method as set forth in claim 1, further comprising a step of calculating reburning mass flows for said furnace.

4. The method as set forth in claim 1, wherein said thermodynamic property comprises an enthalpy flow rate.

5. The method as set forth in claim 1, wherein said proceeding and calculating step comprises a step of determining an amount of heat loss for each segment in said furnace.

6. The method as set forth in claim 1, wherein said proceeding and calculating step comprises a step of determining an amount of useful heat transfer for each segment in said furnace.

7. The method as set forth in claim 1, wherein said step of calculating said thermodynamic property of each mass flow entering the segment comprises the steps of calculating an enthalpy of each mass flow and calculating an enthalpy flow rate of each mass flow.

8. The method as set forth in claim 1, wherein said step of calculating said thermodynamic property of said unreacted mixture comprises the steps of calculating an enthalpy of said unreacted mixture, determining thermodynamic coefficients which relate thermodynamic properties to temperature for said unreacted mixture, and determining a temperature of said unreacted mixture.

9. The method as set forth in claim 1, wherein said step of calculating a composition of said reacted flow exiting each segment comprises the step of determining products from combustion of reactants in said unreacted mixture.

10. The method as set forth in claim 1, wherein said step of calculating said thermodynamic property of said composition comprises the steps of calculating a mass flow rate, an enthalpy, an enthalpy flow rate, and a temperature of said composition.

11. The method as set forth in claim 1, wherein one of said segments in said furnace is a regenerator and said step of calculating comprises a step of calculating an amount of heat transfer in said regenerator.

12. The method as set forth in claim 1, wherein one of said segments in said furnace is a recuperator and said step of calculating comprises a step of calculating an amount of heat transfer in said recuperator.

13. The method as set forth in claim 1, further comprising the steps of changing at least one of said parameters and repeating said step of determining and said step of proceeding and calculating with said one structural parameter changed.

14. The method as set forth in claim 1, further comprising the steps of changing at least one of said operating conditions and repeating said step of determining and said step of proceeding and calculating with said one operating condition changed.

15. A system for determining a mass and energy balance for a furnace, comprising:
   means for determining structural parameters of said furnace, operating conditions for said furnace, and segments which comprise said furnace; and
   means for proceeding through said segments of said furnace and for successively calculating, for each segment in said furnace, a thermodynamic property of each entering mass flow, said thermodynamic property of an unreacted mixture of the entering mass flows, a composition of an exiting reacted flow, and said thermodynamic property of said composition.

16. The system as set forth in claim 15, further comprising:
   means for generating a revised set of operating conditions for said furnace based on an output of said proceeding and calculating means;
   means for comparing said initial operating conditions with said revised set of operating conditions and for indicating differences between said initial operating conditions and said revised operating conditions; and
   means for routing said revised set of operating conditions to said proceeding and calculating means when said differences are greater than a predefined set of tolerances.

17. The system as set forth in claim 15, further comprising means for calculating reburning mass flows for said furnace.

18. The system as set forth in claim 15, wherein said thermodynamic property comprises an enthalpy flow rate.

19. The system as set forth in claim 15, wherein said proceeding and calculating means determines an amount of heat loss for each segment in said furnace.

20. The system as set forth in claim 15, wherein said proceeding and calculating means determines an amount of useful heat transfer for each segment in said furnace.

21. The system as set forth in claim 15, wherein said calculating means calculates an enthalpy of each mass flow and an enthalpy flow rate of each mass flow.

22. The system as set forth in claim 15, wherein said calculating means calculates an enthalpy of said unreacted mixture, thermodynamic coefficients which relate thermodynamic properties to temperature for said unreacted mixture, and a temperature of said unreacted mixture.

23. The system as set forth in claim 15, wherein said calculating means calculates said composition based on a complete combustion of reactants in said unreacted mixture into products.

24. The system as set forth in claim 15, wherein said calculating means calculates a mass flow rate, an enthalpy, an enthalpy flow rate, and a temperature of said composition.

25. The system as set forth in claim 15, wherein one of said segments in said furnace is a regenerator and said calculating means calculates an amount of heat transfer in said regenerator.

26. The system as set forth in claim 15, wherein one of said segments in said furnace is a recuperator and said calculating means calculates an amount of heat transfer in said recuperator.

27. A method for modeling a behavior of a furnace, comprising the steps of:
   reading values of structural parameters defining said furnace and operating conditions for said furnace;
   determining whether said furnace has a recuperator or a regenerator;
   retrieving a regenerator model if said furnace has said regenerator and deriving a first amount of heat transfer in said regenerator based on said regenerator model; and
   retrieving a recuperator model if said furnace has said recuperator and deriving a second amount of heat transfer in said recuperator based on said recuperator model.

28. The method as set forth in claim 27, wherein said step of retrieving said regenerator model further comprises a step of performing a mass and energy balance to determine a mass flow rate and total energy content for each flow within said furnace.

29. The method as set forth in claim 27, wherein said step of retrieving said recuperator model further comprises a step of performing a mass and energy balance to determine a mass flow rate and an enthalpy flow rate for each flow within said furnace.

30. The method as set forth in claim 27, further comprising a step of changing at least one parameter and repeating said step of determining and one structural of said steps of retrieving.

31. The method as set forth in claim 27, further comprising a step of changing at least one operating condition and repeating said step of determining and one of said steps of retrieving.

32. The method as set forth in claim 27, further comprising a step of revising said furnace to have a reburning system and repeating said step of determining and one of said steps of retrieving.

33. A computer-readable medium having a computer program, said computer program comprising:
   means for reading values of structural parameters defining said furnace and operating conditions for said furnace;
   means for determining whether said furnace has a recuperator or a regenerator;
   means for retrieving a regenerator model if said furnace has said regenerator and deriving a first amount of heat transfer in said regenerator based on said regenerator model; and
   means for retrieving a recuperator model if said furnace has said recuperator and deriving a second amount of heat transfer in said recuperator based on said recuperator model.

34. The computer-readable medium as set forth in claim 33, wherein said computer-readable medium is a semiconductor memory.

35. The computer-readable medium as set forth in claim 33, wherein said computer-readable medium is a portable medium to be inserted within and read by a computer.

36. The computer-readable medium as set forth in claim 33, wherein said computer-readable mediums is a portable medium to be scanned with a computer and transferred to a second computer-readable medium.

37. The computer-readable medium as set forth in claim 36, wherein said computer-readable medium is paper and said computer program is printed on said paper.

38. A computer-readable medium having a computer program, said computer program comprising:
   means for determining structural parameters of said furnace, operating conditions for said furnace, and segments which comprise said furnace; and
   means for proceeding through said segments of said furnace beginning with a first segment in which primary air is input and ending with a last segment in which flue gas is output to a stack and successively calculating for each segment in said furnace a thermodynamic property of each mass flow entering the segment, said thermodynamic property of an unreacted mixture of said mass flows entering each segment, a composition of a reacted flow exiting each segment, and said thermodynamic property of said composition.

39. The computer-readable medium as set forth in claim 38, wherein said computer-readable medium is a semiconductor memory.

40. The computer-readable medium as set forth in claim 38, wherein said computer-readable medium is a portable magnetic tape.

41. The computer-readable medium as set forth in claim 38, wherein said computer-readable medium is a portable medium to be scanned with a computer and transferred to a second computer-readable medium.

42. The computer-readable medium as set forth in claim 41, wherein said computer-readable medium is paper and said computer program is printed on said paper.

* * * * *